(12) United States Patent
Chasman et al.

(10) Patent No.: US 11,539,663 B2
(45) Date of Patent: Dec. 27, 2022

(54) SYSTEM AND METHOD FOR MIDSERVER FACILITATION OF LONG-HAUL TRANSPORT OF TELEMETRY FOR CLOUD-BASED SERVICES

(71) Applicant: QOMPLX, Inc., Tysons, VA (US)

(72) Inventors: Mike Chasman, Herndon, VA (US); Jeffrey Chung, Reston, VA (US); Jason Crabtree, Vienna, VA (US); Luka Jurukovski, Arlington, VA (US); Richard Kelley, Woodbridge, VA (US); Artem Panasenkov, Reston, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 802 days.

(21) Appl. No.: 16/412,340

(22) Filed: May 14, 2019

(65) Prior Publication Data

US 2020/0014659 A1 Jan. 9, 2020

Related U.S. Application Data

(63) Continuation-in-part of application No. 16/267,893, filed on Feb. 5, 2019, which is a continuation-in-part
(Continued)

(51) Int. Cl.
*H04L 9/40* (2022.01)
*G06F 8/61* (2018.01)
(Continued)

(52) U.S. Cl.
CPC ............ *H04L 63/0218* (2013.01); *G06F 8/61* (2013.01); *G06F 9/44505* (2013.01);
(Continued)

(58) Field of Classification Search
CPC ............ H04L 63/0218; H04L 12/4641; H04L 41/0806; H04L 63/0272; H04L 63/0428;
(Continued)

(56) References Cited

U.S. PATENT DOCUMENTS 5,669,000 A 9/1997 Jessen et al.
7,072,863 B1 7/2006 Philips et al.
(Continued)

FOREIGN PATENT DOCUMENTS

CN 105302532 B 6/2018

OTHER PUBLICATIONS

Himes (Using Ansible to generate complex configs, May 31, 2018, 5 pages) (Year: 2018).*
(Continued)

*Primary Examiner* — Oleg Korsak
(74) *Attorney, Agent, or Firm* — Galvin Patent Law LLC; Brian R. Galvin

(57) ABSTRACT

A system and method that uses midservers located between the business enterprise computer infrastructure and the cloud-based infrastructure to collect, aggregate, analyze, transform, and securely transmit data from a multitude of computing devices and peripherals at an external network to a cloud-based service.

6 Claims, 18 Drawing Sheets

Related U.S. Application Data of application No. 16/248,133, filed on Jan. 15, 2019, which is a continuation-in-part of application No. 15/813,097, filed on Nov. 14, 2017, now abandoned, which is a continuation-in-part of application No. 15/616,427, filed on Jun. 7, 2017, now abandoned, which is a continuation-in-part of application No. 14/925,974, filed on Oct. 28, 2015, now abandoned, application No. 16/412,340, which is a continuation-in-part of application No. 16/267,893, filed on Feb. 5, 2019, which is a continuation-in-part of application No. 16/248,133, filed on Jan. 15, 2019, which is a continuation-in-part of application No. 15/806,697, filed on Nov. 8, 2017, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, application No. 16/412,340, which is a continuation-in-part of application No. 16/267,893, filed on Feb. 5, 2019, which is a continuation-in-part of application No. 16/248,133, filed on Jan. 15, 2019, which is a continuation-in-part of application No. 15/806,697, filed on Nov. 8, 2017, now abandoned, which is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, which is a continuation-in-part of application No. 15/206,195, filed on Jul. 8, 2016, now abandoned, application No. 16/412,340, which is a continuation-in-part of application No. 16/267,893, filed on Feb. 5, 2019, which is a continuation-in-part of application No. 16/248,133, filed on Jan. 15, 2019, which is a continuation-in-part of application No. 15/673,368, filed on Aug. 9, 2017, now abandoned, which is a continuation-in-part of application No. 15/376,657, filed on Dec. 13, 2016, now Pat. No. 10,402,906, application No. 16/412,340, which is a continuation-in-part of application No. 16/267,893, filed on Feb. 5, 2019, which is a continuation-in-part of application No. 16/248,133, filed on Jan. 15, 2019, which is a continuation-in-part of application No. 15/849,901, filed on Dec. 21, 2017, now Pat. No. 11,023,284, which is a continuation-in-part of application No. 15/835,312, filed on Dec. 7, 2017, now Pat. No. 11,055,451, which is a continuation-in-part of application No. 15/186,453, filed on Jun. 18, 2016, now abandoned, application No. 16/412,340, which is a continuation-in-part of application No. 16/267,893, filed on Feb. 5, 2019, which is a continuation-in-part of application No. 16/248,133, filed on Jan. 15, 2019, which is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962.

(60) Provisional application No. 62/568,298, filed on Oct. 4, 2017, provisional application No. 62/568,291, filed on Oct. 4, 2017.

(51) Int. Cl.
| | |
|---|---|
| *H04L 41/0806* | (2022.01) |
| *G06F 9/445* | (2018.01) |
| *G06F 9/455* | (2018.01) |
| *H04L 67/104* | (2022.01) |
| *H04L 67/141* | (2022.01) |
| *H04L 12/46* | (2006.01) |
| *G06N 99/00* | (2019.01) |

(52) U.S. Cl.
CPC ......... *G06F 9/45533* (2013.01); *G06N 99/00* (2013.01); *H04L 12/4641* (2013.01); *H04L 41/0806* (2013.01); *H04L 63/0272* (2013.01); *H04L 63/0428* (2013.01); *H04L 63/0807* (2013.01); *H04L 63/1441* (2013.01); *H04L 67/104* (2013.01); *H04L 67/141* (2013.01)

(58) Field of Classification Search
CPC ............. H04L 63/0807; H04L 63/1441; H04L 67/104; H04L 67/141; G06F 8/61; G06F 9/44505; G06F 9/45533; G06N 99/00
See application file for complete search history.

(56) References Cited

U.S. PATENT DOCUMENTS

| | | |
|---|---|---|
| 2007/0021955 A1 | 1/2007 | Tolone et al. |
| 2007/0043656 A1 | 2/2007 | Lancaster |
| 2008/0027690 A1 | 1/2008 | Watts |
| 2008/0221949 A1 | 9/2008 | Delurgio et al. |
| 2009/0222562 A1 | 9/2009 | Liu et al. |
| 2011/0208681 A1 | 8/2011 | Kuecuekyan |
| 2012/0116743 A1 | 5/2012 | Ayala et al. |
| 2012/0266244 A1 | 10/2012 | Green et al. |
| 2014/0156806 A1 | 6/2014 | Karpistsenko et al. |
| 2014/0279762 A1 | 9/2014 | Xaypanya et al. |
| 2015/0149979 A1 | 5/2015 | Talby et al. |
| 2015/0169294 A1 | 6/2015 | Brock et al. |
| 2015/0186427 A1 | 7/2015 | Logothetis et al. |
| 2015/0379424 A1 | 12/2015 | Dirac et al. |
| 2016/0078361 A1 | 3/2016 | Brueckner et al. |
| 2016/0092557 A1 | 3/2016 | Stojanovic et al. |
| 2016/0164905 A1 | 6/2016 | Phinney et al. |
| 2016/0364307 A1 | 12/2016 | Garg et al. |
| 2017/0193110 A1 | 7/2017 | Crabtree et al. |

(56) References Cited

U.S. PATENT DOCUMENTS

2017/0323089 A1   11/2017  Duggal et al.
2018/0115519 A1*  4/2018  Bonomi .............. H04L 63/1458

OTHER PUBLICATIONS

MatthiasLohr (Provide a method Peer.close(), Mar. 27, 2013, 5 pages) (Year: 2013).*
Microsoft (What's New in Kerberos Authentication, Aug. 31, 2016, 22 pages) (Year: 2016).*

* cited by examiner

SYSTEM AND METHOD FOR MIDSERVER FACILITATION OF LONG-HAUL TRANSPORT OF TELEMETRY FOR CLOUD-BASED SERVICES

CROSS-REFERENCE TO RELATED APPLICATIONS

| Application No. | Date Filed | Title |
|---|---|---|
| Current application | Herewith | SYSTEM AND METHOD FOR MIDSERVER FACILITATION OF LONG-HAUL TRANSPORT OF TELEMETRY FOR CLOUD-BASED SERVICES<br>Is a continuation-in-part of: |
| 16/267,893 | Feb. 5, 2019 | SYSTEM AND METHODS FOR DETECTING AND CHARACTERIZING ELECTROMAGNETIC EMISSIONS<br>which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS<br>which is a continuation-in-part of: |
| 15/813,097 | Nov. 14, 2017 | EPISTEMIC UNCERTAINTY REDUCTION USING SIMULATIONS, MODELS AND DATA EXCHANGE<br>which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH<br>which claims benefit of, and priority to: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | SYSTEM AND METHOD FOR MIDSERVER FACILITATION OF LONG-HAUL TRANSPORT OF TELEMETRY FOR CLOUD-BASED SERVICES<br>Is a continuation-in-part of: |
| 16/267,893 | Feb. 5, 2019 | SYSTEM AND METHODS FOR DETECTING AND CHARACTERIZING ELECTROMAGNETIC EMISSIONS<br>which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS<br>which is also a continuation-in-part of: |
| 15/806,697 | Nov. 8, 2017 | MODELING MULTI-PERIL CATASTROPHE USING A DISTRIBUTED SIMULATION ENGINE<br>which is a continuation-in-part of: |
| 15/376,657 | Dec. 13, 2016 | QUANTIFICATION FOR INVESTMENT VEHICLE MANAGEMENT EMPLOYING AN ADVANCED DECISION PLATFORM<br>which is a continuation-in-part of: |
| 15/237,625 | Aug. 15, 2016 | DETECTION MITIGATION AND REMEDIATION OF CYBERATTACKS EMPLOYING AN ADVANCED CYBER-DECISION PLATFORM<br>which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE<br>which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION<br>which is a continuation-in-part of: |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY<br>which is a continuation-in-part of: |

-continued

| Application No. | Date Filed | Title |
|---|---|---|
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 | Apr. 5, 2016 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 | Dec. 31, 2015 | DISTRIBUTED SYSTEM FOR LARGE VOLUME DEEP WEB DATA EXTRACTION |
| | | and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | SYSTEM AND METHOD FOR MIDSERVER FACILITATION OF LONG-HAUL TRANSPORT OF TELEMETRY FOR CLOUD-BASED SERVICES |
| | | Is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/806,697 | Nov. 8, 2017 | MODELING MULTI-PERIL CATASTROPHE USING A DISTRIBUTED SIMULATION ENGINE |
| | | which is a continuation-in-part of: |
| 15/343,209 | Nov. 4, 2016 | RISK QUANTIFICATION FOR INSURANCE PROCESS MANAGEMENT EMPLOYING AN ADVANCED DECISION PLATFORM |
| | | which is a continuation-in-part of: |
| 15/237,625 | Aug. 15, 2016 | DETECTION MITIGATION AND REMEDIATION OF CYBERATTACKS EMPLOYING AN ADVANCED CYBER-DECISION PLATFORM |
| | | and is also a continuation-in-part of: |
| 15/229,476 | Aug. 5, 2016 | HIGHLY SCALABLE DISTRIBUTED CONNECTION INTERFACE FOR DATA CAPTURE FROM MULTIPLE NETWORK SERVICE SOURCES |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| Current application | Herewith | SYSTEM AND METHOD FOR MID SERVER FACILITATION OF LONG-HAUL TRANSPORT OF TELEMETRY FOR CLOUD-BASED SERVICES |
| | | Is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/673,368 | Aug. 9, 2017 | AUTOMATED SELECTION AND PROCESSING OF FINANCIAL MODELS |
| | | which is a continuation-in-part of: |
| 15/376,657 | Dec. 13, 2016 | QUANTIFICATION FOR INVESTMENT VEHICLE MANAGEMENT EMPLOYING AN ADVANCED DECISION PLATFORM |

-continued

| Application No. | Date Filed | Title |
|---|---|---|
| Current application | Herewith | SYSTEM AND METHOD FOR MIDSERVER FACILITATION OF LONG-HAUL TRANSPORT OF TELEMETRY FOR CLOUD-BASED SERVICES |
| | | Is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/849,901 | Dec. 21, 2017 | SYSTEM AND METHOD FOR OPTIMIZATION AND LOAD BALANCING OF COMPUTER CLUSTERS |
| | | which is a continuation-in-part of: |
| 15/835,312 | Dec. 7, 2017 | SYSTEM AND METHODS FOR MULTI-LANGUAGE ABSTRACT MODEL CREATION FOR DIGITAL ENVIRONMENT SIMULATIONS |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| Current application | Herewith | SYSTEM AND METHOD FOR MID SERVER FACILITATION OF LONG-HAUL TRANSPORT OF TELEMETRY FOR CLOUD-BASED SERVICES |
| | | Is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/849,901 | Dec. 21, 2017 | SYSTEM AND METHOD FOR OPTIMIZATION AND LOAD BALANCING OF COMPUTER CLUSTERS |
| | | which is a continuation-in-part of: |
| 15/835,436 | Dec. 7, 2017 | TRANSFER LEARNING AND DOMAIN ADAPTATION USING DISTRIBUTABLE DATA MODELS |
| | | which is a continuation-in-part of: |
| 15/790,457 | Oct. 23, 2017 | DISTRIBUTABLE MODEL WITH BIASES CONTAINED WITHIN DISTRIBUTED DATA |
| | | which claims benefit of, and priority to: |
| 62/568,298 | Oct. 4, 2017 | DISTRIBUTABLE MODEL WITH BIASES CONTAINED IN DISTRIBUTED DATA |
| | | and is also a continuation-in-part of: |
| 15/790,327 | Oct. 23, 2017 | DISTRIBUTABLE MODEL WITH DISTRIBUTED DATA |
| | | which claims benefit of, and priority to: |
| 62/568,291 | Oct. 4, 2017 | DISTRIBUTABLE MODEL WITH DISTRIBUTED DATA |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION | the entire specification of each of which is incorporated herein by reference.

BACKGROUND OF THE INVENTION

Field of the Art

The disclosure relates to the field of computer technology, more specifically to the field of computer architectures for enterprise data collection, analysis, and transmission to cloud-based services.

Discussion of the State of the Art

As cloud-based computing services become more popular, management of the data collection from a business and transmission of that data to a cloud-based service become more complicated. Large business enterprises can have thousands of computers and peripherals, many of which are now mobile devices. Collection, management, and security of data from those many devices becomes particularly important where data is being transferred to a cloud-based service.

When a large business enterprise uses a cloud-based computing service, heterogeneous data transfer between cloud services and large offices or campuses for organizations presents numerous problems, including lack of reliable data collection methods, poor standardized support for connection-oriented protocols by network appliances, security concerns with unfiltered or poorly filtered data, and bandwidth concerns with constantly streaming data which may result in network slowdown due to unprioritized data transfer. Additionally, larger business enterprises may have thousands of computing devices sending data to a cloud-based service on separate connections, and each such connection represents an additional security risk. Further, current data collection and models do not scale well for adding new data sources and flexible adhoc queries, resulting in too much data being passed, no context for data and data sources oftentimes, unqueryable data and data sources, inability to flexibly and quickly add new data sources such as new devices or user accounts which generate new data for analysis, and log management and data storage become expensive and disorganized.

The problem is compounded by the use of black box threat detection methods, where data management and security optimization are not possible for each organization or user of a cloud-based service. Particularly in the context of data ingestion systems, it is often unclear from a data stream what portion of the data results in triggering of certain security alerts, requiring many costly hours of analytics at best, or resulting in missed errors or security concerns at worst.

What is needed is a computer architecture and methodology that allows for collection, aggregation, analysis, transformation, and secure transmission of data from a multitude of computing devices and peripherals at a business enterprise network to a cloud-based service.

SUMMARY OF THE INVENTION

Accordingly, the inventor has conceived, and reduced to practice, a system and method that uses midservers integrated with the business enterprise computer infrastructure and the cloud-based infrastructure to collect, aggregate, analyze, transform, and securely transmit data from a multitude of computing devices and peripherals at an external network to a cloud-based service. The following non-limiting summary of the invention is provided for clarity, and should be construed consistently with embodiments described in the detailed description below.

According to a preferred embodiment, a system for ingestion of data into a cloud-based service from an external network is disclosed, comprising: a midserver configured to function as an interface between an external network and a cloud-based service comprising at least a processor, a memory, and a plurality of programming instructions stored in the memory and operating on the processor: receive data from a plurality of computing devices on the external network; run one or more containerized services to process the received data; and securely transmit the processed data to a cloud-based service.

According to another preferred embodiment, a method for ingestion of data into a cloud-based service from an external network is disclosed, comprising the steps of: installing a midserver as an interface between an external network and a cloud-based service, the midserver comprising at least a processor, a memory, and a plurality of programming instructions stored in the memory and operating on the processor: receiving data from a plurality of computing devices on the external network; running one or more containerized services to process the received data; and securely transmitting the processed data to a cloud-based service.

According to an aspect of an embodiment, the containerized services include one or more of the following types of containerized services: traffic processors, sensors, management services, and utilities.

According to an aspect of an embodiment, the midserver is installed at the same location from which some part of the external network is operated.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
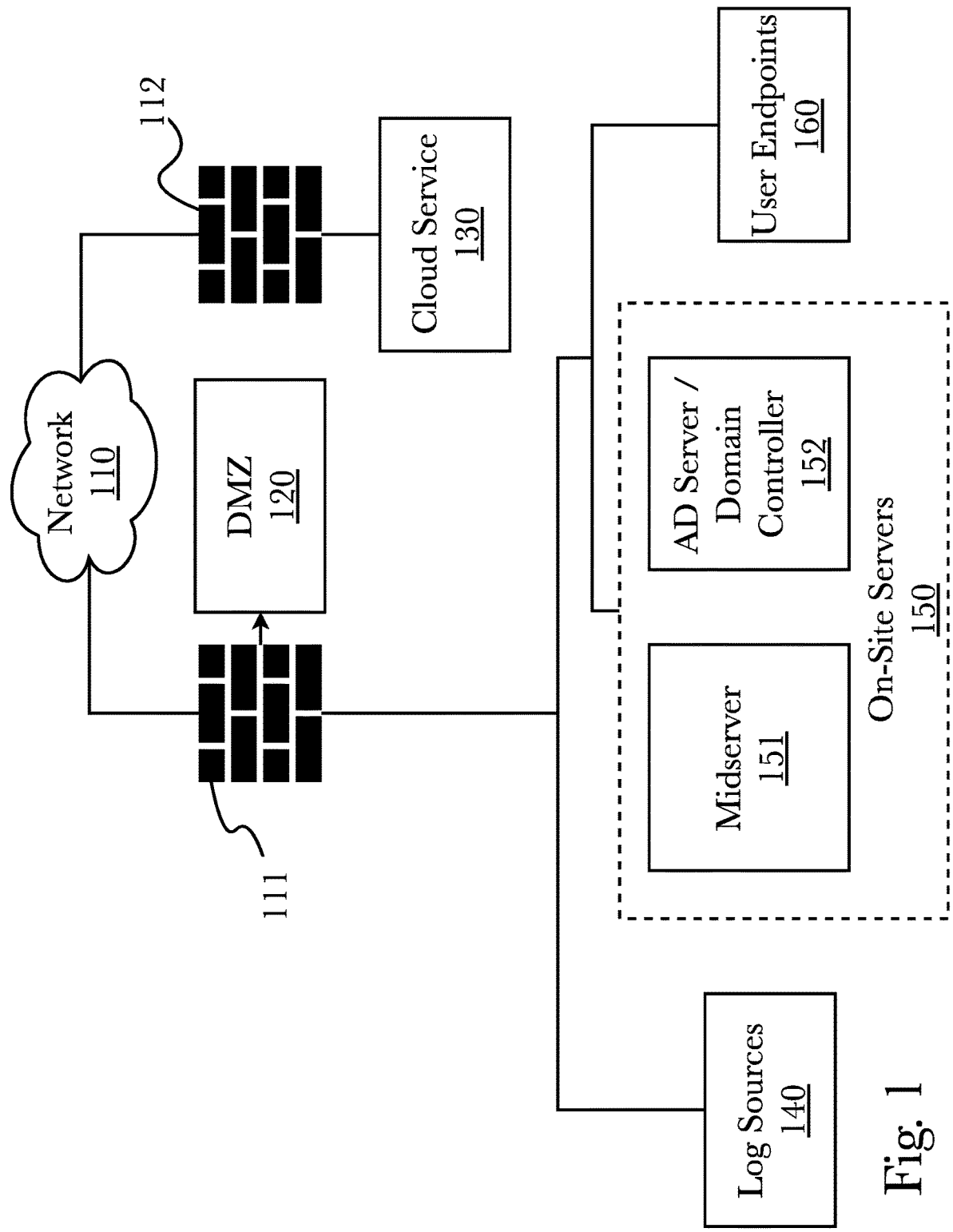
FIG. 1 is a diagram of an exemplary midserver system architecture.

The inventor has conceived, and reduced to practice, a system and method that uses midservers located between the business enterprise computer infrastructure and the cloud-based infrastructure to collect, aggregate, analyze, transform, and securely transmit data from a multitude of computing devices and peripherals at an external network to a cloud-based service.

One method of data collection from large business enterprises for cloud-based computing is through agent based monitoring. In agent-based monitoring, software "agents" are installed on each computing device to collect data and then forward the data to the cloud-based service. Using agent-based monitoring, it may be necessary to install hundreds or thousands of agents on an external network to collect the required data. Each of these agents, in turn, establish an outgoing network connection to provide data to the cloud-based service. While secure transport protocols such as TLS can ensure data security, the overall number of connections to monitor at the business network edge increases substantially. This causes even more noise for network defenders to sift through. By aggregating data at midservers multiple connections can be presented over the network as a single secure connection to enterprise cloud-based systems (wlog using standard VPN or similar encryption-based network transport technologies). Thousands of connections from a large business enterprise can be reduced to a single connection or a small number of connections. It should be noted that another method of gathering data from a business enterprise network is through port mirroring. The terms "agent" and "port mirroring" are exemplary only, and do not exclude other methods of gathering data from a business enterprise network.

Midserver architecture also solves the problem that not all devices support secure data transport. For example, many devices do not natively support sending system log messages using TLS. In order to support system log traffic the data must be wrapped in a secure protocol before leaving the network. A midserver can provide this type of capability by collecting and wrapping the data before it leaves the network.

Midservers can optimize the ingestion of data into the cloud-based service by transforming the data prior to forwarding upstream. It is possible to process the data on the external network computers using an agent or additional software, but this adds complexity to the agent or requires more software installed on customer site. A midserver can act as a local processing station (often called "pre-processing") for data transformations such as compression, protocol wrapping, port bending, and many others.

Midservers can be used to prevent data loss during transmission, especially for network data that is transitory in nature. For many protocols the sender/receiver can adjust for a degraded connection without any loss of data integrity. Additionally, in some other cases the originating message can be reproduced meaning that a loss of data has little impact on the capability. For example, some agents query the current state of the system and then forward the results to a fleet manager. If the results are somehow lost during transit it is possible to issue the same query and try again. However, other data sources such as network packet captures are much less forgiving. Systems that capture ephemeral network traffic are especially impacted by data lost in transit. A midserver can mitigate this risk by providing traffic buffering in the event that the backhaul connection goes down. When the connection is reestablished, the buffers will empty and continue forwarding as usual.

The midserver architecture may be designed to operate as a bastion host that runs a collection of containerized services. It is assumed that midservers are cyber security targets and are likely to be compromised at some point. Ideally, therefore, the midserver should be designed to reduce data loss and further access to the enterprise network to which it is attached. Midservers should not be a primary data store, and should only buffer data when connections are lost. Midservers should have only the minimum software necessary to operate, and least privilege should be enforced for access. Midservers may be configured as a single server instance or as a clusters of redundant servers to provide additional resiliency.

The midserver runs a plurality of containerized services that serve to collect, aggregate, analyze, transform, and securely transmit data. The containerized service run by the midserver can be roughly categorized in four ways: traffic processors, sensors, management services, and utilities.

Containers acting as traffic processors are primarily used to receive forwarded traffic from a customer network, transform the traffic if necessary, and then forward the traffic upstream over the primary connection. Several examples of traffic processing containerized services are: reverse proxy containers, system log containers, and messaging containers. An example of a reverse proxy containerized service is Nginx. The Nginx proxy (nginx-pxy) provides reverse proxy capabilities that allows customer traffic to send approved data through the midserver. Data and log sources that support the proxy protocol will connect to this service. The service also provides traffic transform capabilities such as http to https forwarding and others as supported by Nginx. In a system log containerized service, the service provides log consolidation and forwarding capabilities for logs sent using the system log protocol. The service also provides message shaping and enrichment such as adding additional contextual fields to log sources if needed. An example of a messaging containerized service is RabbitMQ, The RabbitMQ service acts as a proxy for advanced messaging queueing protocol (AMQP) messages using the Shovel plugin. The service is primarily used for queuing and forwarding of traffic generated by messaging agents, and can support any AMQP traffic as needed. Another traffic processing containerized service example is Consul, which provides service discovery and is may be used to support RabbitMQ configurations in a midserver cluster.

Containers acting as sensors can monitor and generate data rather than just process data from other sensors or data sources.

Management containers are used for providing management consoles or services for midserver administrators. Examples of management containers include the Nginx management proxy and Portainer. The Nginx management proxy (nginx-mgt) is responsible for managing connections to management interfaces on containers. This containerized service acts a firewall to only allow traffic to management pages and services originating from approved address spaces. Portainer provides a lightweight management UI which allows adminstrators to easily manage and monitor the other container services on the midserver.

Utility containers are special purpose tools used to aid in configuration or deployment of a midserver.

Consolidating these containerized services at the midserver allows for large-scale, reliable ingestion (i.e., one or more of collection, aggregating, analysis (pre-processing), transformation (pre-processing), and secure transmission) of data into a cloud-based service from an external network. This improves data consistency, reliability, efficiency of bandwidth usage, and security. Using the midserver as a gateway to the cloud-based service dramatically reduces the number of connections at the business enterprise's network edge, greatly reducing the number of avenues of attack and improving network security.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way.

One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Bastion host" as used herein means a computer that is deliberately exposed on a public network as the primary or only node or the network exposed to the outside world. A bastion host processes and filters all incoming traffic and prevents malicious traffic from entering the network.

"Ingestion" as used herein means the transfer of data into a cloud-based service.

"Midserver" as used herein means a server that functions as an interface between an external network and a cloud-based service, and which runs one or more containerized services that perform one or more of: collecting, aggregating, analyzing, filtering, transforming, and securely transmitting data. A midserver may also be configured as a bastion host.

Conceptual Architecture

FIG. 1 is a diagram of an exemplary midserver system architecture. A network 110 exists connecting a cloud service 130, through a firewall or security layer 112, as well as an on-site security layer or firewall 111 with some organization which may wish to connect over a network 110 to a cloud service 130. A demilitarized zone ("DMZ," also known as a perimeter network or screened subnet) 120 is present which may present the forward-facing network connections and functionality of an organization's network or services, which may be forwarded data or interface further with on-site servers 150 and user endpoints 160, or data log sources 140. On-site servers 150 may include a midserver 151 for collecting, aggregating, analyzing, filtering, transforming, and securely transmitting data data transfers and interactions with a cloud service 130, typically co-located with the enterprise domain controller (or Active Directory (AD) server) 152 for exploration of network-enabled directories and to control access to and authenticate security requests on the network for other connected servers 150. A midserver 151 in this implementation may be used for streamlined communications with a cloud service 130 including a single point of connectivity with the service, a ticket form of security adding further security to such a connected system, and a batch method of data transfer, allowing numerous other servers 150 or endpoints 160 or log sources 140 to communicate with the midserver which then collates data for transfer to a cloud server 130, which may further collate data received from the cloud service 130, for ease of analysis and which allows for other forms of network optimization to take place which are not present in systems where numerous endpoints and servers maintain individual connections to a cloud service 130, also allowing for new data sources including servers 150 and endpoints 160 to be added swiftly and integrated into the system for connection to the cloud service 130 rapidly and easily due to the midserver 151 acting as an interface between the service 130 and the other possible endpoint 160 or server 150.

Figure 2:
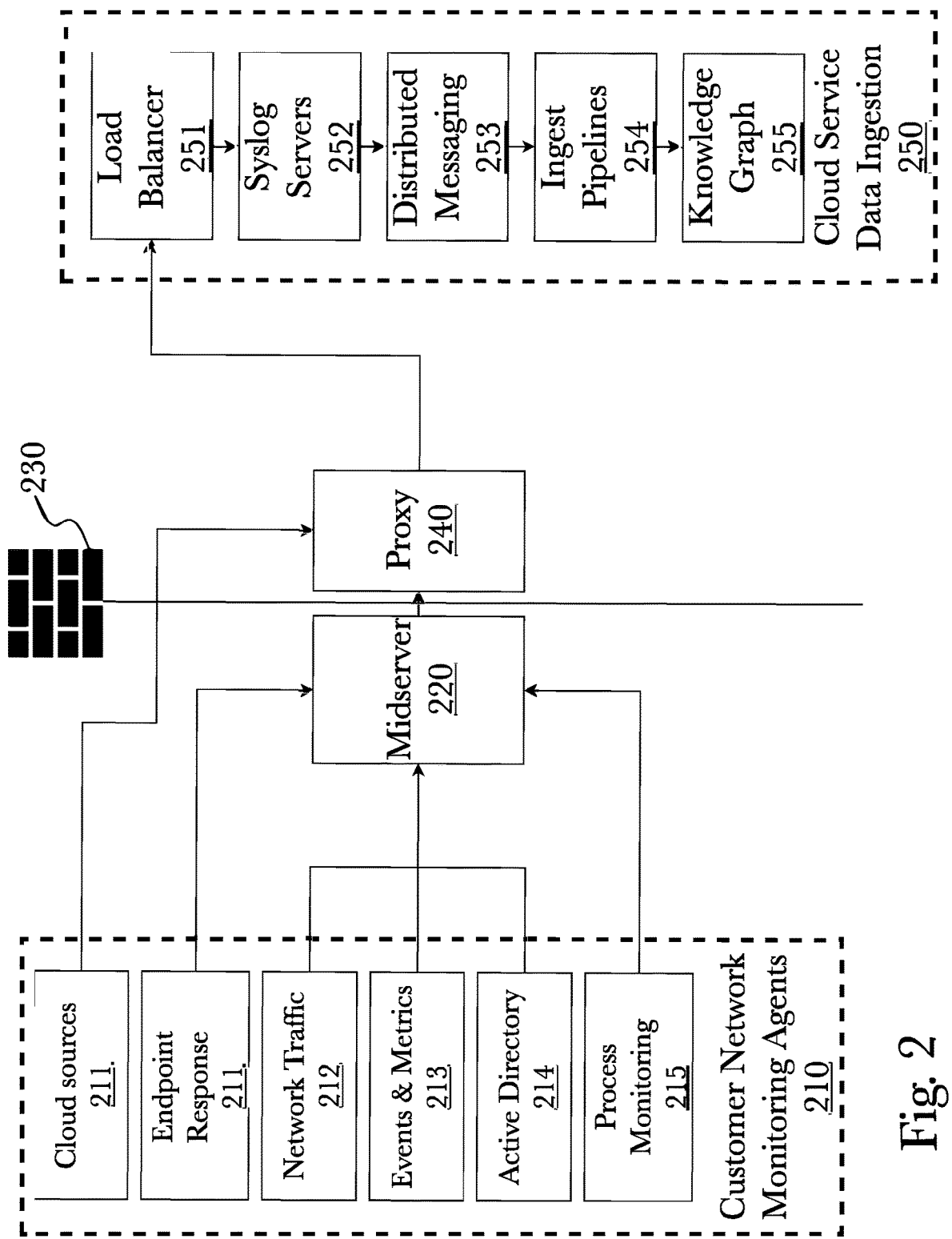
FIG. 2 is a diagram of an exemplary midserver architecture showing data input to a midserver and the ingestion of forwarded data from a midserver through a proxy to a cloud service.

FIG. 2 is a diagram of an exemplary midserver architecture showing data input to a midserver and the ingestion of forwarded data from a midserver through a proxy to a cloud service. Cloud sources 211 of customer monitoring agents 210 may provide input to a proxy server 240 behind a firewall 230 which filters data going in and out of an organization's network. These sources of customer network monitoring agents 210 may include data that is gathered from online tools such as social media crawlers or any other source of customer network monitoring from a cloud service or network 211. On-site data monitoring tools and processes include endpoint responses 211, network traffic data 212, events and metrics 213 which may include metadata about devices, users, or other connected assets, active directory 214 usage, and process monitoring 215 which may monitor active processes on connected assets such as operations performed on a connected network endpoint such as a computer workstation. Data from these sources is sent to a midserver 220 which may be on-site or connected to via a Virtual Private Network (VPN), before the data is sent to through an organizations firewall 230 to a proxy server 240, to be forwarded to a cloud service's data ingestion pipeline 250. Such a data ingestion pipeline 250 may include the use of a load balancer 251 to aid in processing of received data loads from differing sources, system log servers 252 which may record the reception and content of data or any other metadata about the connection to a proxy server 240 and the activity of the load balancer 251, before forwarding data to a distributed messaging system 253 which may separate received data and data streams into related "topics" which may be defined by the sender's identity, metadata about the streams or batches of data, or some other qualifier. Ingestion pipelines 254 may process data by filtering, mapping, parsing, and sanitizing data received, before adding it to a temporal knowledge graph 255 representing a graph of assets, people, events, processes, services, and "tickets" of concerns, as well as data about the edges connecting such nodes in the graph such as their relationship, over time.

Figure 3:
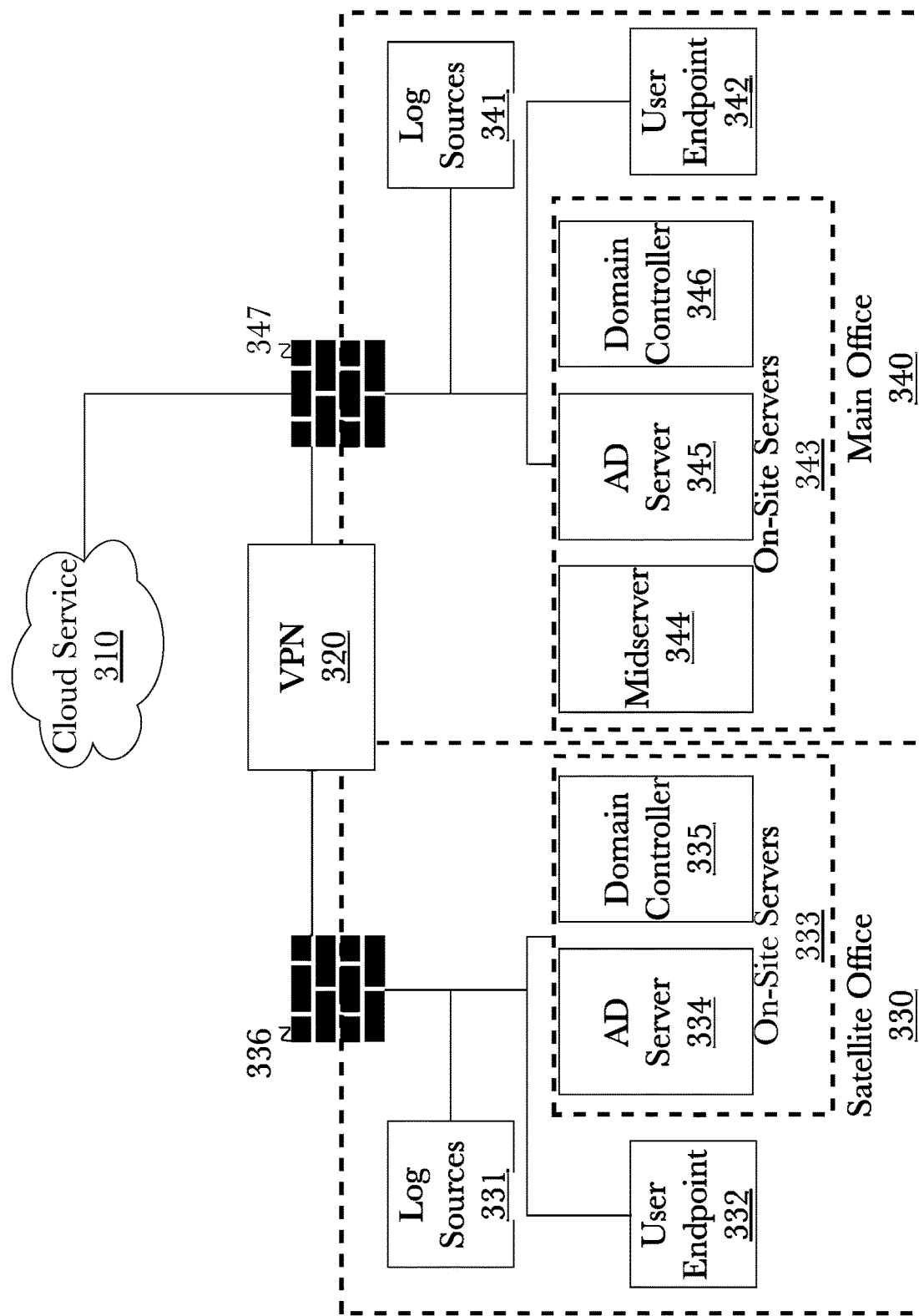
FIG. 3 is a diagram of an exemplary midserver architecture between multiple office locations.

FIG. 3 is a diagram of an exemplary midserver architecture between multiple office locations. A cloud service 310 exists which connects to a may connect to a main office 340 but not a satellite office 330 over a network such as the Internet, with a VPN 320 connected between the networks of the offices. A satellite office 330 contains numerous assets including log sources 331, user endpoints 332, and a server or servers 333 which include the functionality of an Active Directory (AD) server 334 and domain controller 335. Also operating on a satellite office 330 is firewall 336, in addition to firewall on a main office's network 347, which provides basic security to a satellite office's network 330 and a main office's network 340. Connected via a VPN 320 with a satellite office 330 is a main office 340, which comprises many of the same components, including log sources 341, at least one user endpoint 342, and a group of servers 343 including at least an AD server 345 and domain controller 346, as well as a midserver 344, which may communicate with a satellite office 330 to provide access to midserver functionality without using the satellite office's 330 bandwidth to external networks. Midservers 344 may be deployed as a single instance, or as a cluster depending on the traffic volume leaving the office 340 premise to support high availability operational requirements. These servers may be co-located with the domain controllers 346 and other servers 343, but may be placed anywhere on the network. The exact number and configuration of midservers 344 may be tailored to the organizational environment and the specific overall network architecture. It is possible to place a midserver 344 (or cluster of such) at the main office 340 only, as shown in FIG. 3. In this configuration, the agents (or log source 331) installed at the satellite office 330 will forward all traffic across the VPN connection 320 to the Midserver 344 at the Main Office 340, which will then forward the traffic to the cloud infrastructure 310 via the gateway at that location.

Figure 4:
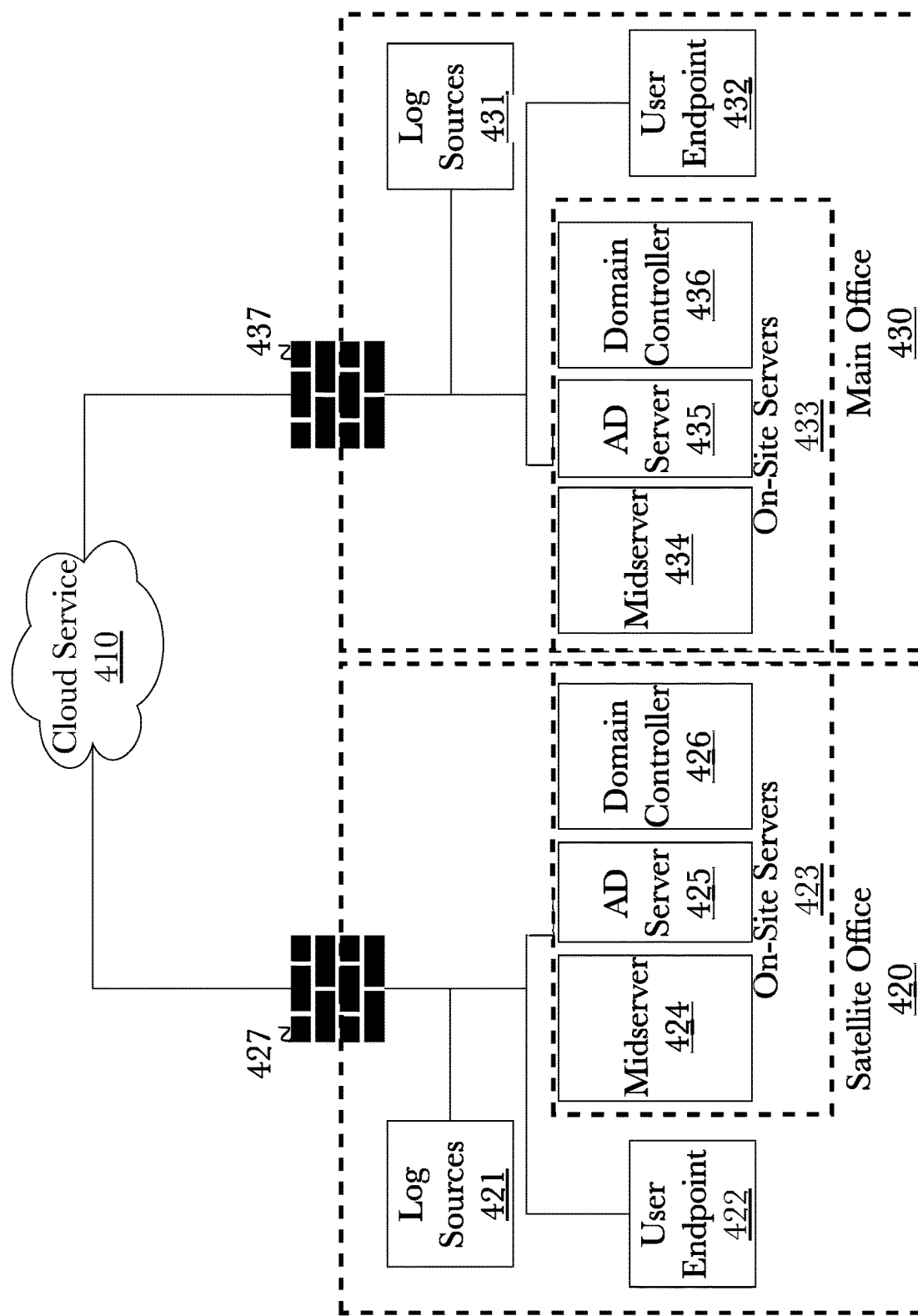
FIG. 4 is diagram of another exemplary midserver architecture between multiple office locations.

FIG. 4 is diagram of another exemplary midserver architecture between multiple office locations. An alternative configuration compared to FIG. 3 is shown, placing one or more midservers at the satellite office and allowing traffic to egress the network locally instead of through a VPN connection to other locations. A cloud service 410 exists which connects directly to a main office 430 and a satellite office 420 over a network such as the Internet. A satellite office 420 contains numerous assets including log sources 421, user endpoints 422, and a server or servers 423 which include the functionality of a midserver 424, an Active Directory (AD) server 425, and a domain controller 426. Also operating on a satellite office 420 is firewall 427, in addition to firewall on a main office's network 437, which provides basic security to a satellite office's network 420 and main office network 430. Connected also with a cloud service 410 is a main office network 430, which comprises many of the same components, including log sources 431, at least one user endpoint 432, and a group of servers 433 including at least an AD server 435 and domain controller 436, as well as a midserver 434, allowing for both office networks 420, 430 to have midserver functionality without requiring a direct or virtual connection.

Figure 5A:
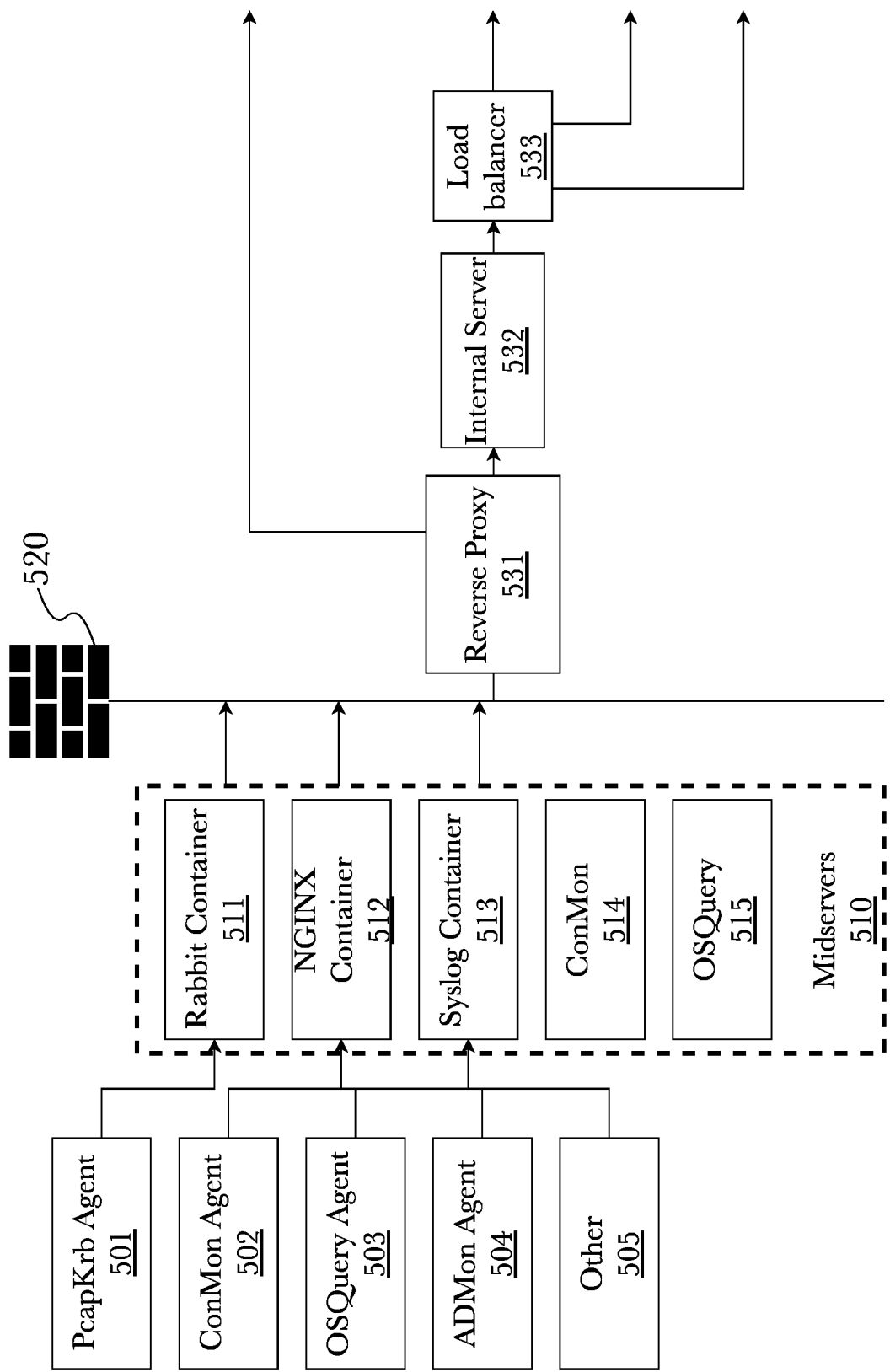
FIG. 5A is a partial diagram of an exemplary advanced cyber-decision platform utilizing midserver architecture.

FIG. 5A is a partial diagram of an exemplary advanced cyber-decision platform utilizing midserver architecture. A plurality of software agents may monitor an organization's network usage, including but not limited to a Kerberos messaging capture (PcapKrb) agent 501 continuous monitoring (Application Performance Monitoring) agents 502, Osquery agents 503, active directory monitoring (ADMon) agents 504, and other agents 505 which may include, for example, data received from system log (syslog) data stores. The plurality of network monitoring agents may feed into a midserver or midservers 510 that may contain message and data processing containerized services, for example: a RabbitMQ container 511, an NGINX container 512, a system log container 513, a continuous monitoring module 514, an Osquery engine 515. The midserver 510 The midserver 510 may communicate through a network firewall 520, to a reverse proxy 531 which may mask the external-facing properties of an internal server 532 of a cloud service. A reverse proxy 531 may forward relevant data, or all data, received from a midserver 510, to an internal server 532, which utilizes a load balancer 533 to process data efficiently and effectively despite possibly asymmetrical or massive network loads, or dynamically changing loads.

Figure 5B:
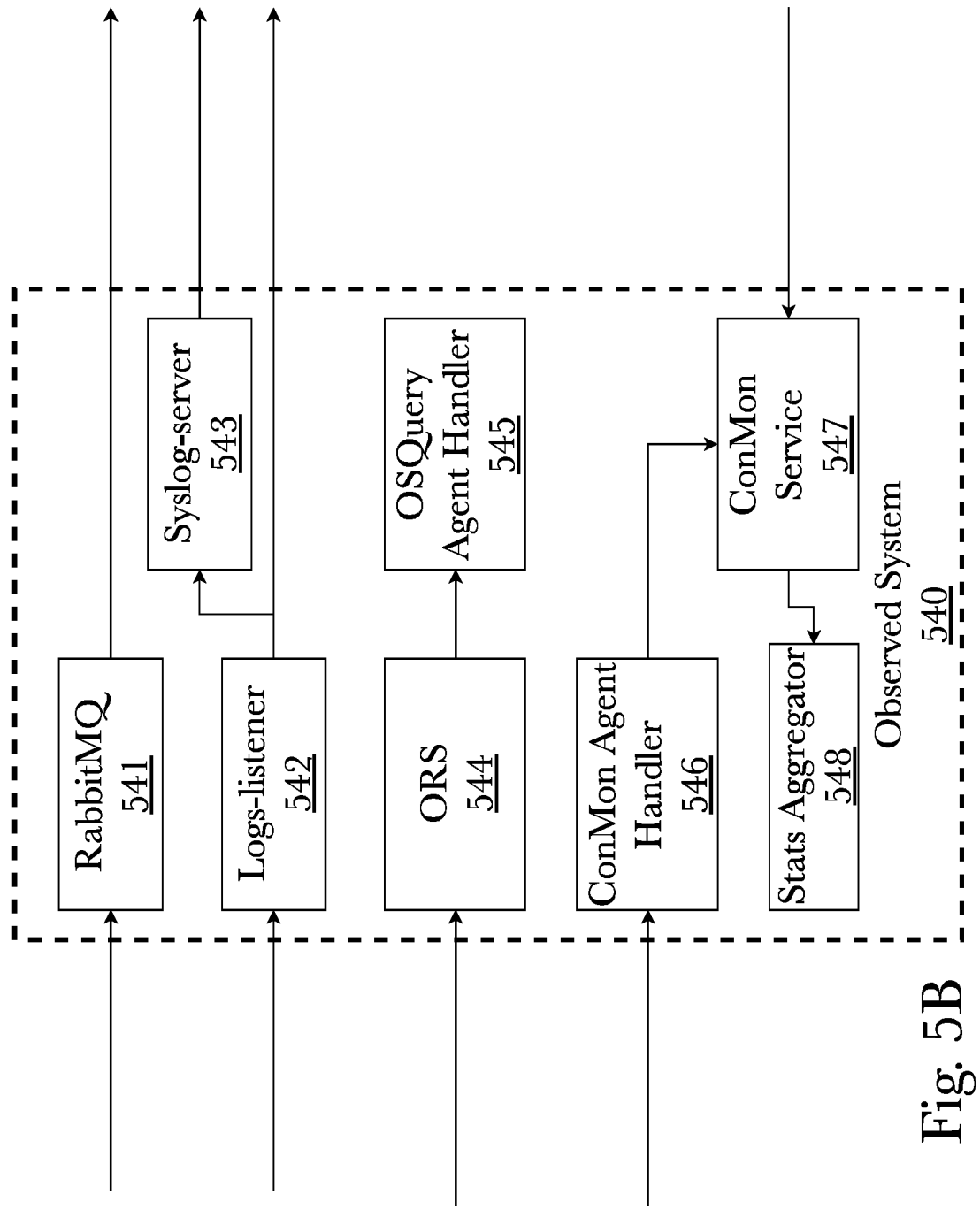
FIG. 5B is a partial diagram of an exemplary advanced cyber-decision platform utilizing midserver architecture.

FIG. 5B is a partial diagram of an exemplary advanced cyber-decision platform utilizing midserver architecture. An observed system 540 is a system that is monitored by an exemplary advanced cyber-decision platform that may communicate with a midserver 510, and may contain at least a message digestion and management service such as RabbitMQ 541, a log listener 542 which communicates with a system log server 543 for the purpose of managing, monitoring, and storing system logs. An observed system may also include an Observer Reporting Server (ORS) 544, which may communicate with an Osquery Agent Handler 545, allowing management, recording, and monitoring of users and systems who use Osquery or a similar system to query a device or server similarly to a database, as is the purpose of Osquery. Also present is a ConMon Agent Handler 546 which my operate as an interface to continuous monitoring connected systems, acting as an interface for a ConMon service 547, which receives further input from systems illustrated in FIG. 5C and may communicate with a statistics aggregator 548.

Figure 5C:
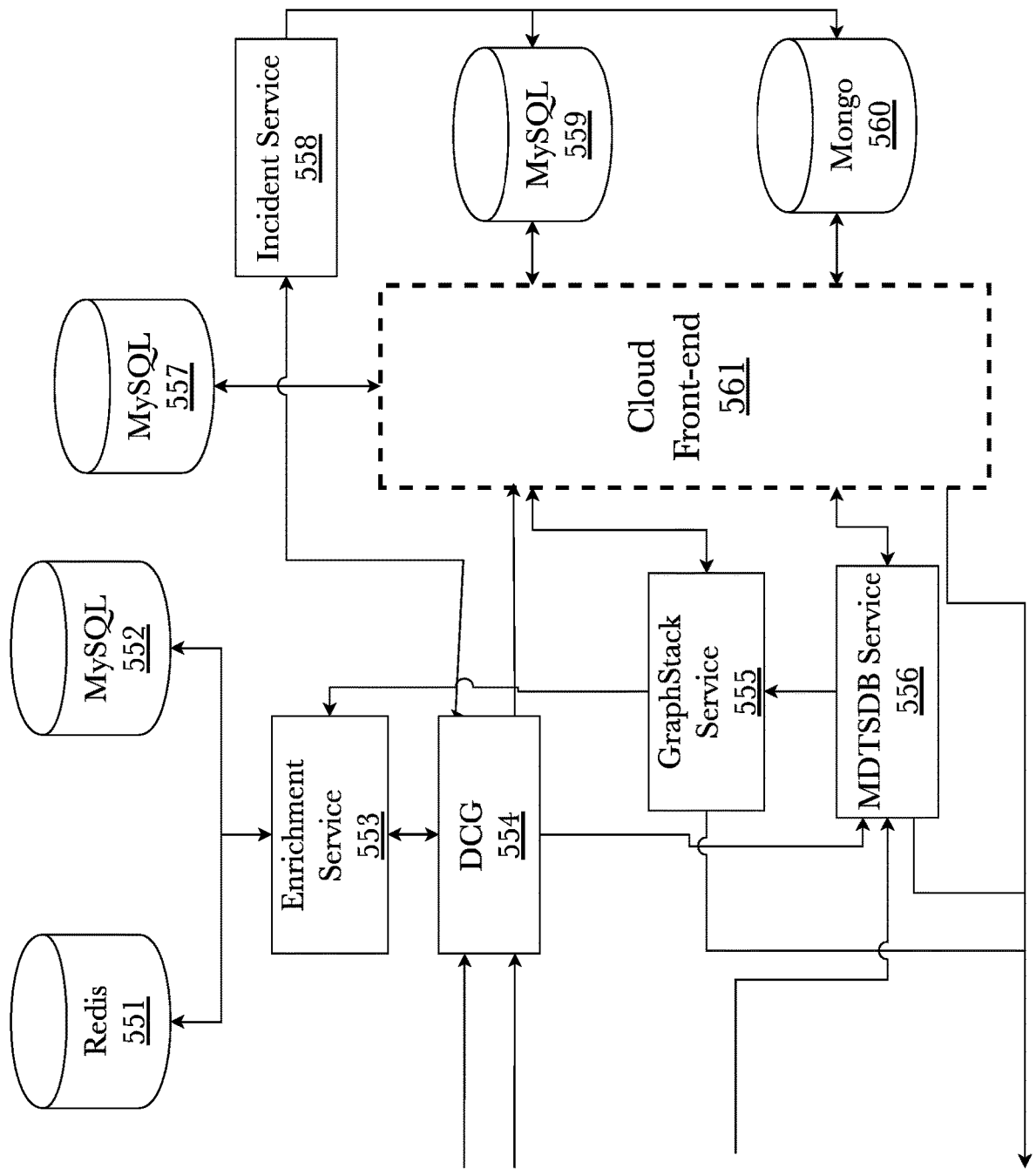
FIG. 5C is a partial diagram of an exemplary advanced cyber-decision platform utilizing midserver architecture.

FIG. 5C is a partial diagram of an exemplary advanced cyber-decision platform utilizing midserver architecture. Data flows from an observed system 540 into a directed computational graph (DCG) 554, and a Multivariate Time-Series Database (MDTSDB) 556. Data from a DCG 554 may move to an enrichment service 553, connected to a plurality of differently structured databases such as MySQL 552 and Redis 551, an enrichment service being able to store and record relevant graph data in these databases 552, 551 and also forward related stored data to a DCG 554, for the purpose of increased accuracy with data processing. A DCG 554 also may send data to a multi-dimensional time series database (MDTSDB) service 556 which relates all received data and records the temporal metadata, resulting in a multidimensional temporal graph with which to relate data, as generated with the help of a graphstack service 555. A graphstack service manages data received from a MDTSDB service 556 and produces the final graph results, with both the results and operation of the MDTSDB 556 and graphstack service 555 being viewable from a cloud service's front end 561, which may also communicate with a plurality of datastores 557, 559, 560. A graphstack service 555 may also forward data to an enrichment service 553 for storage in the connected databases 551, 552, allowing for a constant stream of graph data to be maintained. Lastly, an incident service 558 may be used to receive incident or error data from a directed computational graph 554, recording these incidents in a plurality of databases 559, 560.

Figure 6:
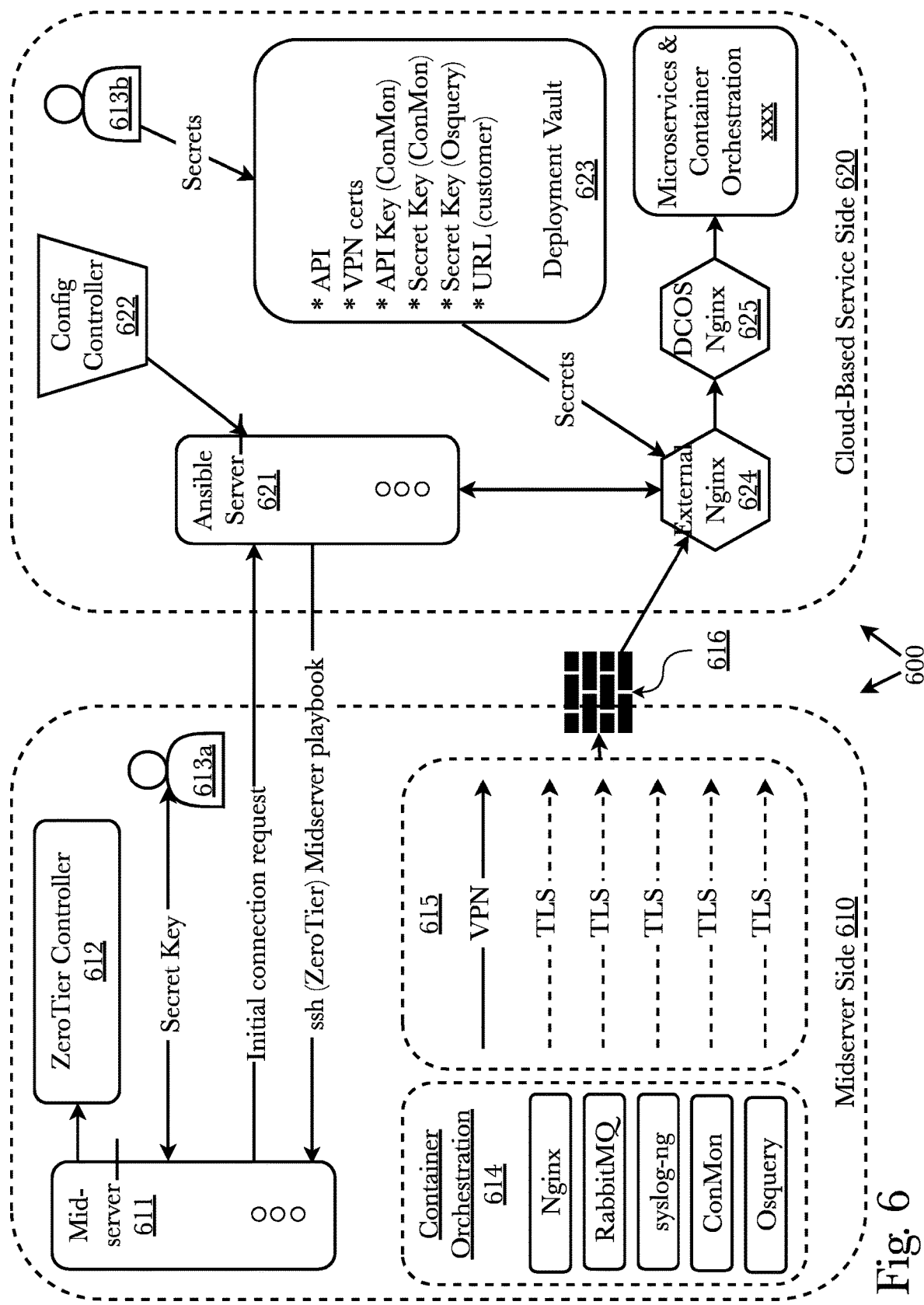
FIG. 6 is a diagram showing an exemplary architecture and methodology for midserver deployment, automated onboarding of data, and endpoint transparent data transport.

FIG. 6 is a diagram showing an exemplary architecture and methodology 600 for midserver deployment, automated onboarding of data, and endpoint transparent data transport. Midserver deployment comprises establishment of a secure connection between the midserver side 610 and the cloud-based service side 620. After a midserver 611 is physically installed, an automated package called a midserver Open Virtual Appliance (OVA) is installed and run on the midserver 611. The OVA in this example is a virtual image pre-installed with only the minimal software on configurations required to initate the deployment process. The OVA will initiate a bootstrap process to establish a secure Peer-to-Peer (P2P) connection to the cloud-based service side. Using ZeroTier as an example of a P2P connection, the OVA will initiate a ZeroTier Controller 612, which is responsible for admitting members to the VPN, issuing certificates, and issuing default configuration information. ZeroTier establishes a secure P2P connection over a virtually extensible local area network (VXLAN) called the Reachback Network. Once the initial connection is requested, a representative of the cloud-based service, either onsite 613a or offsite 613b, will verify and approve the connection using a secret key. After a secure connection is established between the midserver and the cloud-based service side at an Ansible server 621, an Ansible playbook is automatically initiated. First, the playbook downloads the most recent configuration template from a configuration controller 622. Next it connects to a deployment vault 623 instance to retrieve the customer specific configurations including any secrets (e.g. passwords, keys, etc) which will have been previously established by a representative of the cloud-based service 613b. A ZeroTier network application programming interface (API) acts as an adhoc Ansible inventory and a single source of truth for which systems have previously connected to the P2P network. Then, the playbook then begins configurating the midserver 611 via an ssh connection tunnel, establishing a primary backhaul virtual private network (VPN) connection to the cloud-based service. Once this connection is made the midserver tears down the Reachback Network and all communication is done over the VPN through a firewall 616 on the customer network edge. The VPN created using this methodology then allows containerized services 614 to forward data using transport layer security (TLS) 615 to the cloud-based service, allowing for longhaul transportation of data that is transparent to the network endpoint. Some implementations may use external web serving, reverse proxying, caching, and load balancing such as external Nginx 624, data center load balancing and caching such as DCOS Nginx 625, and microservices and container orchestration such as Nginx Plus 626.

Figure 7:
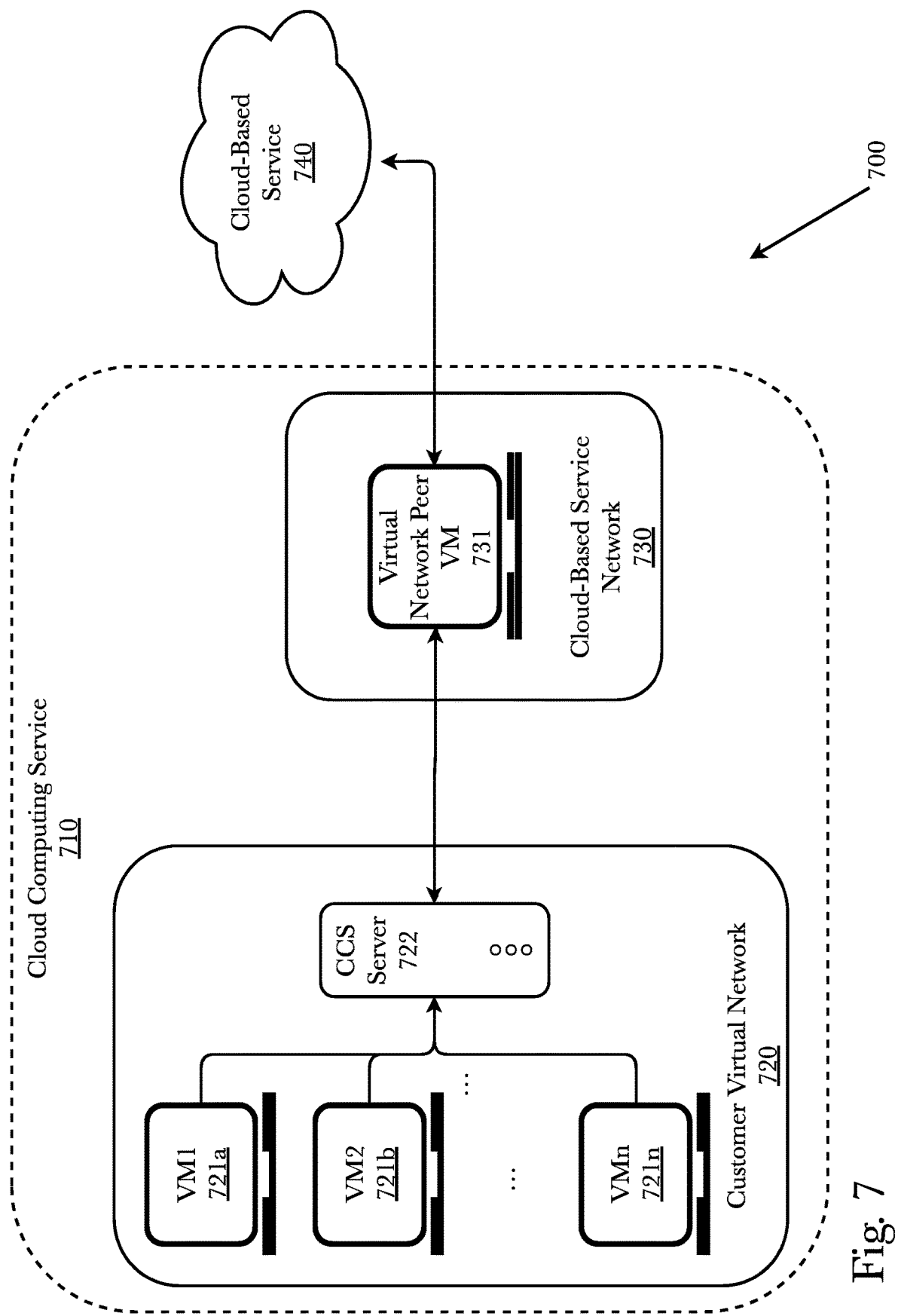
FIG. 7 is an exemplary method for deploying a midserver where the business enterprise network is located on, or utilizes, a cloud computing service such as Amazon Web Services (AWS) or Microsoft's Azure.

FIG. 7 is an exemplary method 700 for deploying a midserver where the business enterprise network is located on, or utilizes, a cloud computing service such as Amazon Web Services (AWS) or Microsoft's Azure. In cloud computing services, all or part of the business enterprise's network is run on the servers of the cloud computing service. Use of midserver architecture where the business enterprise utilizes cloud computing services poses difficulties because the cloud computing service infrastructure is not controlled by the business enterprise, and thus the business enterprise may not be able to authorize the installation of 3$^{rd}$ party software (e.g., Kerberos agents, and other software agents that monitor network traffic) on all or a part of its network. The solution to this problem is to utilize the cloud computing service's functions that allow continuous streaming of virtual machine network traffic to a network packet collector or analytics tool. Using Microsoft's Azure Active Directory service and its virtual network terminal access point (vTAP) as an example, the Azure Active Directory (Azure AD) is a cloud-based identity and access management service that allows employees of a business enterprise to access both external and internal resources. The vTAP function allows continuous streaming of cloud computing service network traffic to a network packet collector or analytics tool, and operates in a manner roughly equivalent to traditional port mirroring. Where the business enterprise manages its own network of virtual machines on the cloud computing service, it may still be possible to install software agents, although use of a continuous streaming function may be more efficient. Where the business enterprise uses the cloud computing service for managed domain services, however, the business enterprise does not have authorization to install agents, and the continuous streaming (port mirroring) function will need to be used to deploy a midserver architecture. In this example, a customer (business enterprise) virtual network 720 is established within the cloud computing service 710. The customer virtual network comprises a number of virtual machines 721*a-n*, operated on one or more of the cloud computing service 710 servers 722. Separately, a cloud-based service network is established on the cloud computing service 710 and is controlled by the cloud-based service 740 to which data is to be forwarded. Using the continuous streaming function available on the cloud computing service 710, for example vTAP for the Azure Active Directory service, a virtual machine on the cloud-based service network 730 is established as a virtual network peer VM 731 to the customer virtual network 720, and all data from the customer virtual network 720 is continuously streamed from the cloud computing service server(s) 722 to the virtual network peer VM 731, which forwards the data to the cloud-based service 740.

Figure 8:
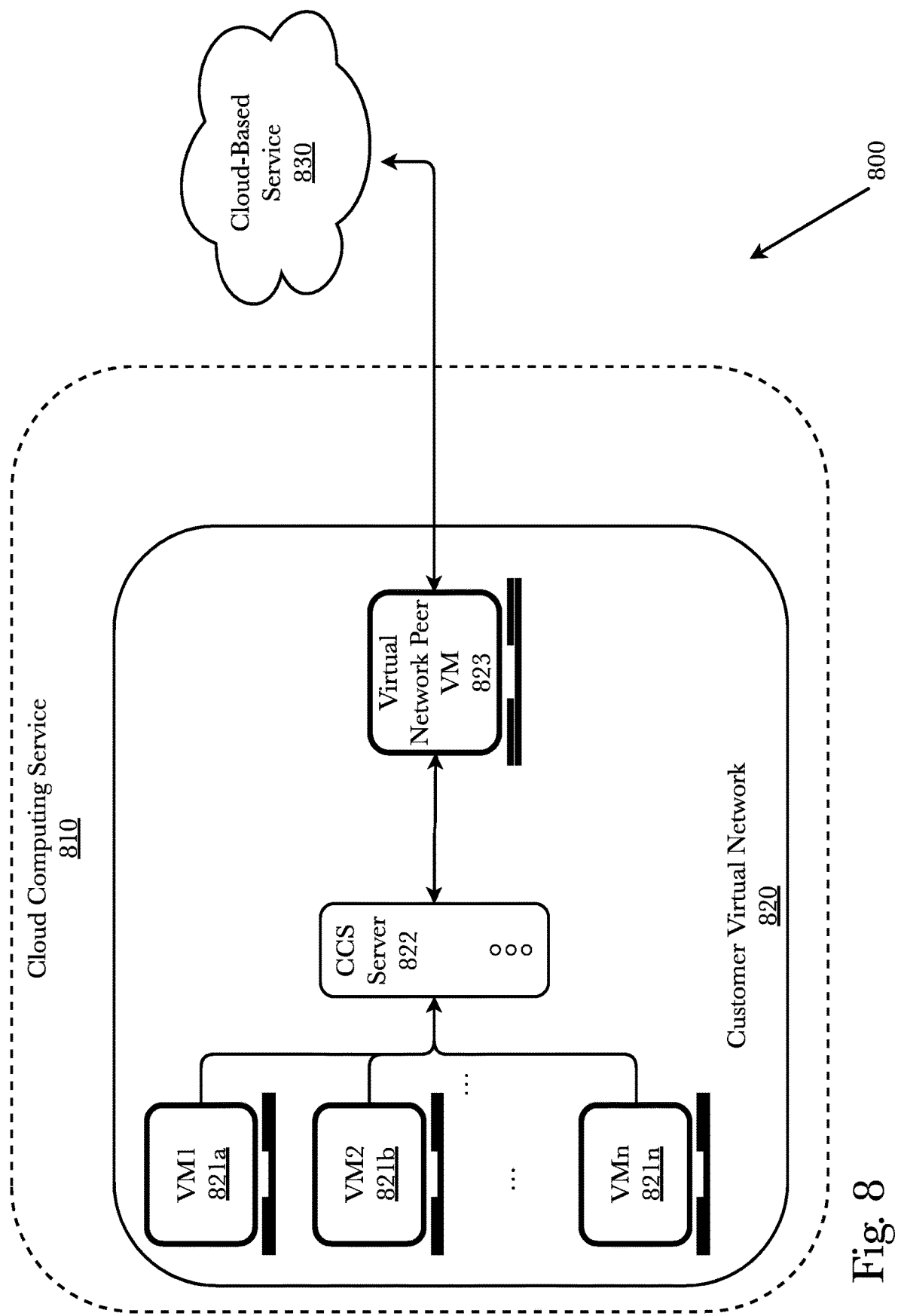
FIG. 8 is another exemplary method for deploying a midserver where the business enterprise network is located on, or utilizes, a cloud computing service such as Amazon Web Services (AWS) or Microsoft's Azure.

FIG. 8 is another exemplary method 800 for deploying a midserver where the business enterprise network is located on, or utilizes, a cloud computing service such as Amazon Web Services (AWS) or Microsoft's Azure. In this example, a customer (business enterprise) virtual network 820 is established within the cloud computing service 810. The customer virtual network comprises a number of virtual machines 821*a-n*, operated on one or more of the cloud computing service 810 servers 822. The customer also operates on the customer virtual network 820 a virtual network peer VM 823 that is configured to aggregate and forward data to the cloud-based service 830, using the continuous streaming function available on the cloud computing service 810, for example vTAP for the Azure Active Directory service. In this manner, all data from the customer virtual network 820 is continuously streamed from the cloud computing service server(s) 822 to the virtual network peer VM 823, which forwards the data to the cloud-based service 830.

Figure 9:
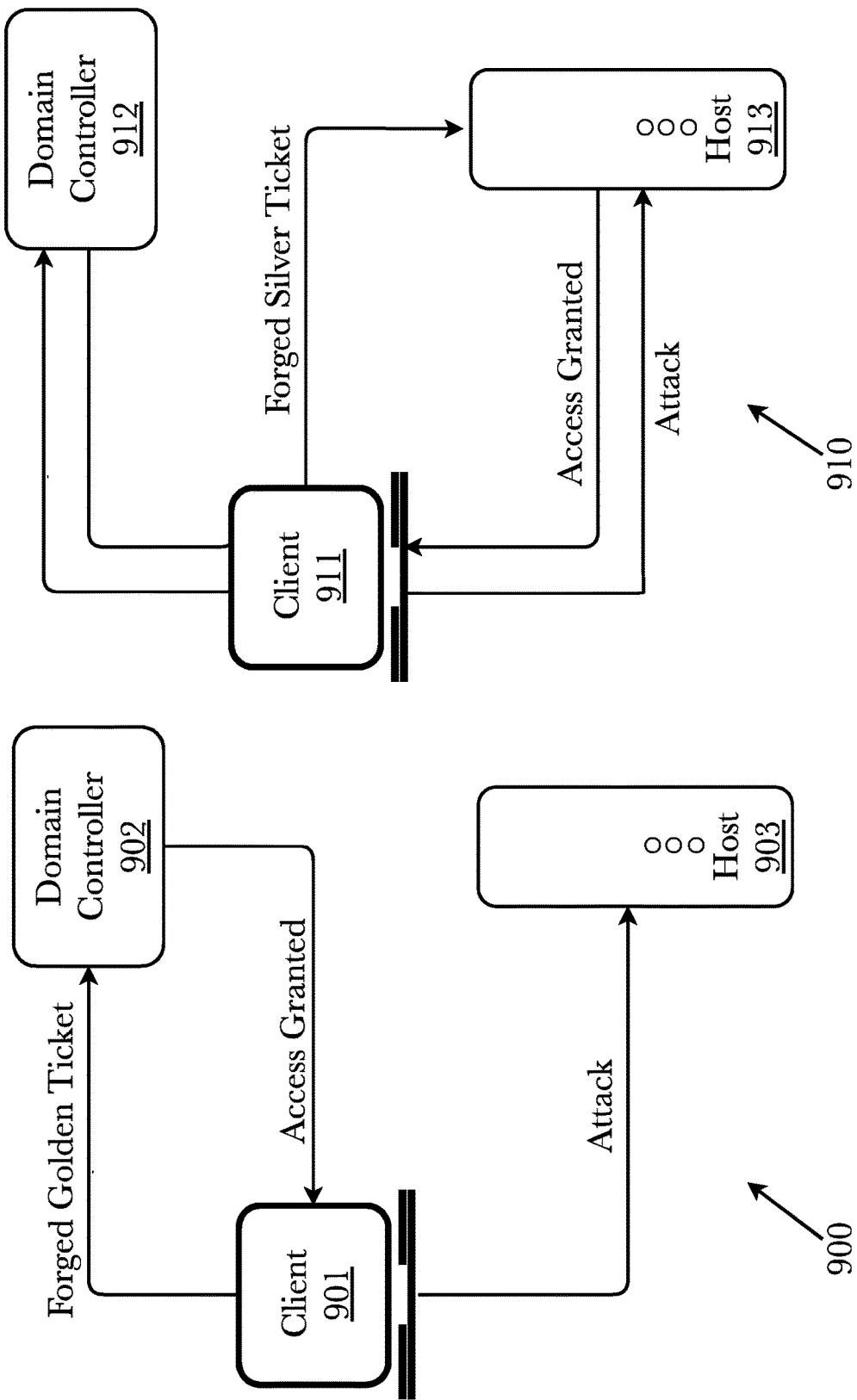
FIG. 9 is a diagram showing an overview of the methodology of two of several known Kerberos attacks.

FIG. 9 is a diagram showing an overview of the methodology of two of several known Kerberos attacks. In the so-called "golden ticket" attack 900, after a client computer 901 has been compromised, a forged ticket is sent to the domain controller 902, which grants access to all servers in the network, and the host server 903 is accessed using the granted access. In the so-called "silver ticket" attack 910, after a client computer 911 has been compromised, a forged ticket granting service (TGS) ticket is sent directly to the host server 913 to be attacked. The host server receiving the forged TGS ticket grants access to the client computer 911 to grant access tickets, which are then used to access the host server 913. Unlike in the golden ticket attack, in the silver ticket attack, the domain controller 912 is not involved in granting access.

Figure 10:
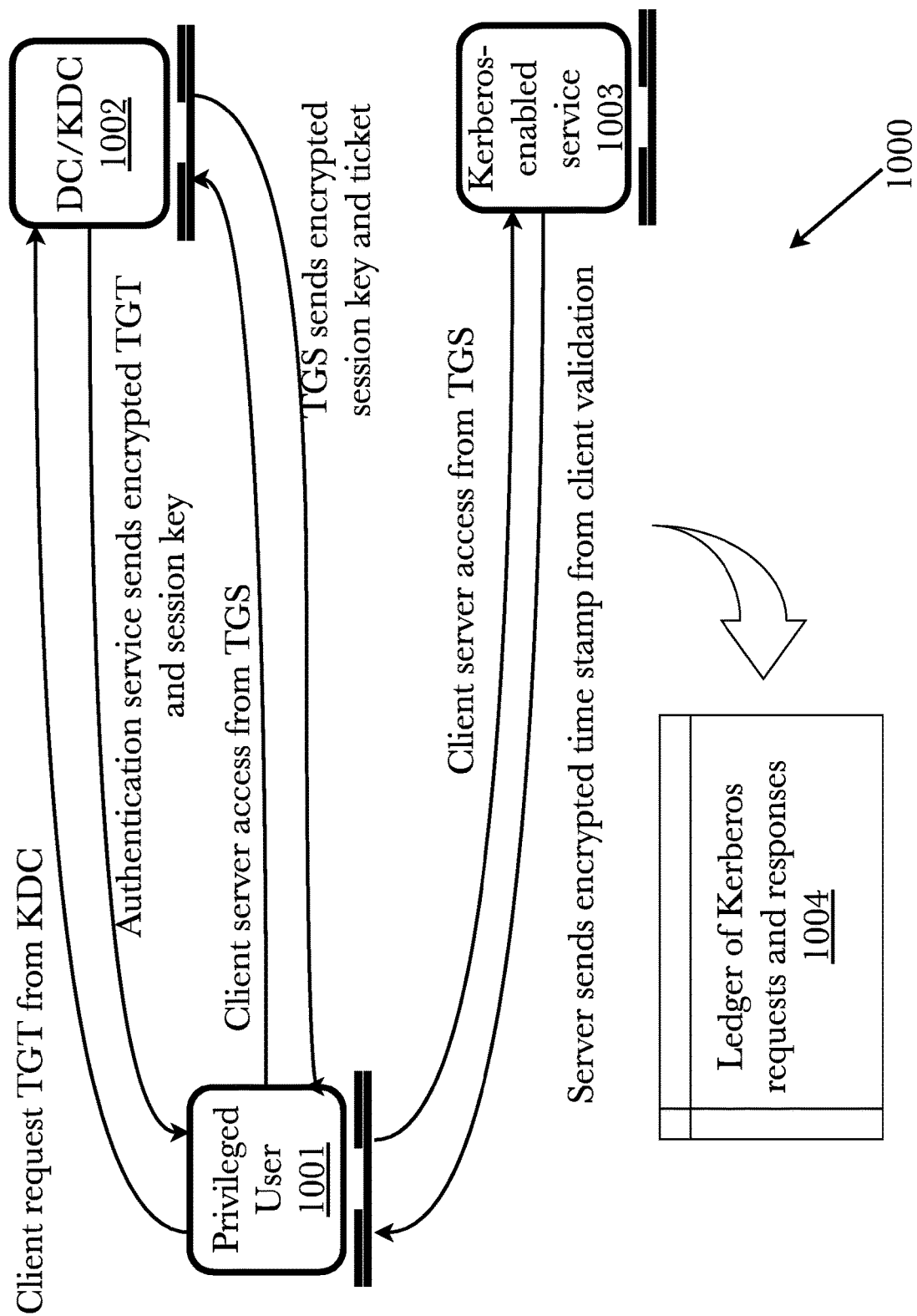
FIG. 10 is a diagram showing an overview of the use of a ledger of Kerberos requests and responses to provide security against Kerberos attacks.

FIG. 10 is a diagram showing an overview of the use of a ledger of Kerberos requests and responses to provide security against Kerberos attacks 1000. In a typical Kerberos authentication interaction, several requests and responses are sent between a user computer 1001, a domain controller, 1002, and a Kerberos-enabled service 1003. Maintaining a ledger 1004 of these requests and responses effectively transforms the Kerberos protocol from a stateless to a stateful one, allowing confirmation of the validity of traffic and providing additional protection against Kerberos attacks.

Figure 11A:
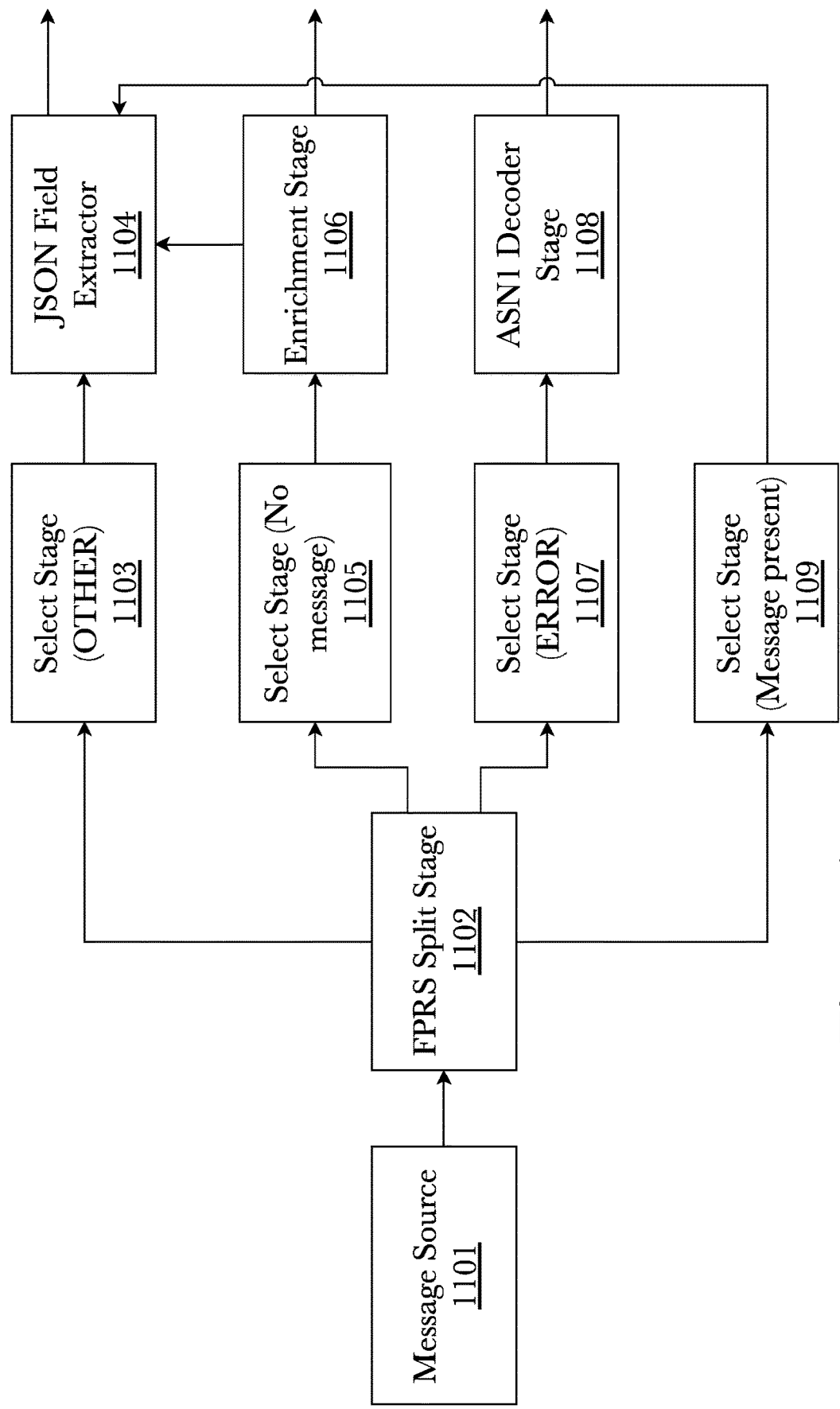
FIG. 11A is a partial diagram of an exemplary analytic workflow for validation of a Kerberos ticket-based security protocol for use in an observed system.

FIG. 11A is a partial diagram of a security analytic workflow validating an exemplary Kerberos ticket-based security protocol for use in an observed system in order to detect common attacks against the Kerberos protocol including those known by the industry as Golden Ticket, Silver Ticket, DCSync, and DCShadow. A messaging source 1101, such as RabbitMQ or NGINX, forwards received data messages to a FPRS split stage 1102, where specific message states are determined and separated to identify high priority tickets, and sent through appropriate processing pipelines. An "OTHER" stage 1103 represents unknown ticket priority and is forwarded to a JSON field extractor 1104 which extracts relevant data fields in Javascript Object Notation (JSON), which is a common data format for object representation in data analytics. A stage where no message is present 1105 represents a ticket with missing information, therefore being sent for an enrichment stage 1106 before being sent to a similar JSON field extractor 1104. An error stage 1107 may also be reached, resulting in the ticket being sent to an Abstract Syntax Notation One (ASN1) decoder 1108, ASN1 being a standard interface description language for defining data structures. If an otherwise normal message is present for a ticket stage 1109, it is sent directly for JSON field extraction 1104.

Figure 11B:
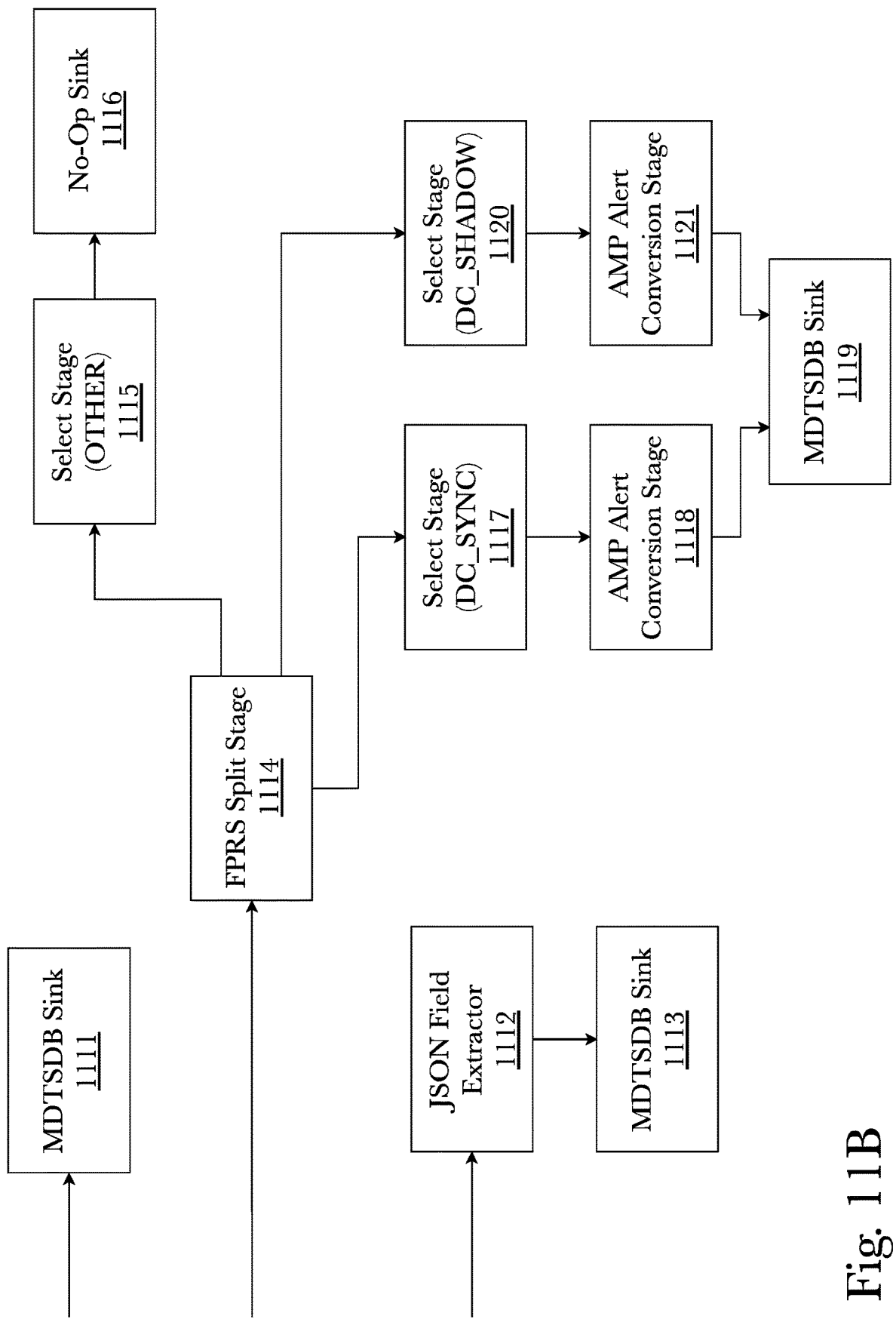
FIG. 11B is a partial diagram of an exemplary analytic workflow for validation of a Kerberos ticket-based security protocol for use in an observed system.

FIG. 11B is a partial diagram of a security analytic workflow validating an exemplary Kerberos ticket-based security protocol for use in an observed system in order to detect common attacks against the Kerberos protocol including those known by the industry as Golden Ticket, Silver Ticket, DCSync, and DCShadow. JSON field data that is extracted 1104 is then forwarded for being placed into a MDTSDB 1111, resulting in it being stored for later use in a temporal knowledge graph. After an error message is ASN1 decoded 1108, it is sent for JSON field extraction 1112, before also being recorded in a MDTSDB 1113. Once a no-message stage has been enriched 1106, it is sent to a secondary FPRS split stage 1114, where the enriched ticket is now determined to possess either an unknown or "OTHER" stage message 1115 and not stored anywhere 1116, or it has a DC_SYNC 1117 or DC_SHADOW 1120 message. In either of the latter two cases a the message is converted into an exemplary advanced malware protection (AMP) alert 1118, 1121 and stored in an MDTSDB 1119.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 12:
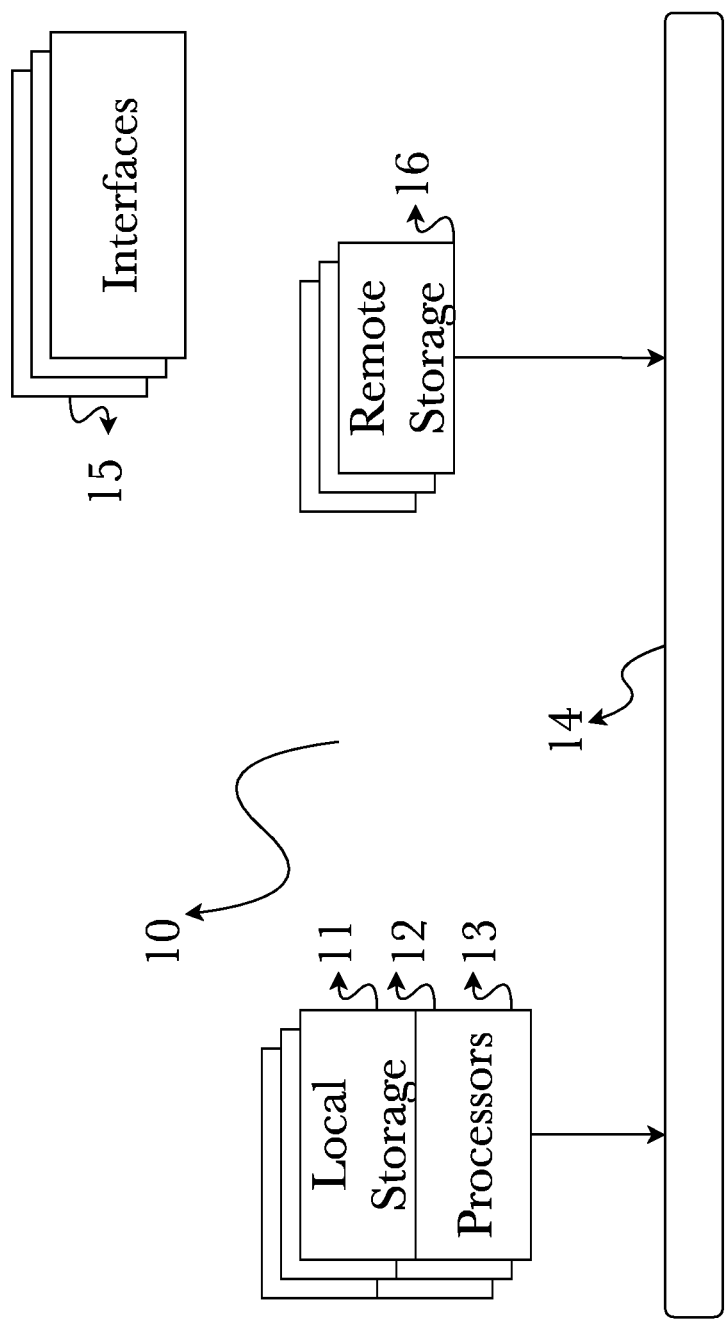
FIG. 12 is a block diagram illustrating an exemplary hardware architecture of a computing device.

Referring now to FIG. 12, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 12 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
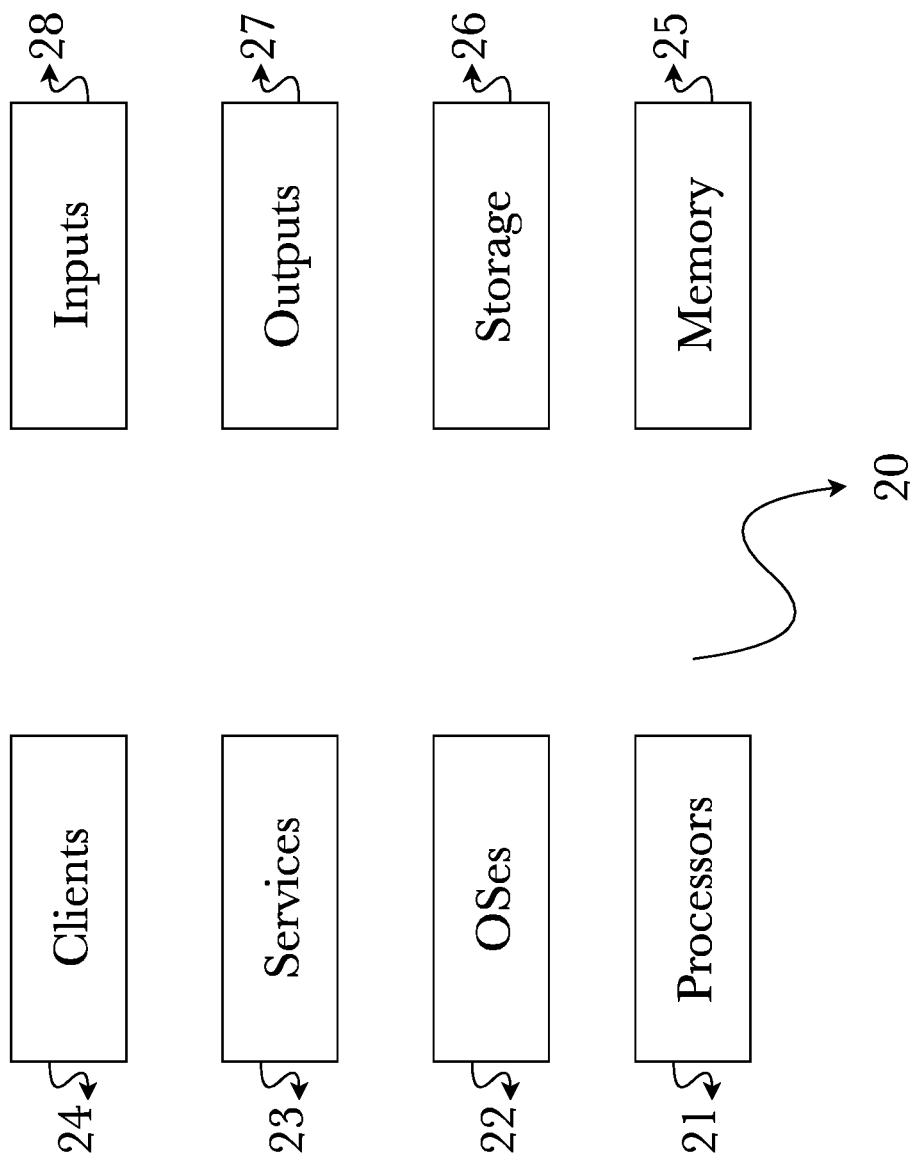
FIG. 13 is a block diagram illustrating an exemplary logical architecture for a client device.

In some embodiments, systems according to the present invention may be implemented on a standalone computing system. Referring now to FIG. 13, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 12). Examples of storage devices 26 include flash memory, magnetic hard drive, CD-ROM, and/or the like.

Figure 14:
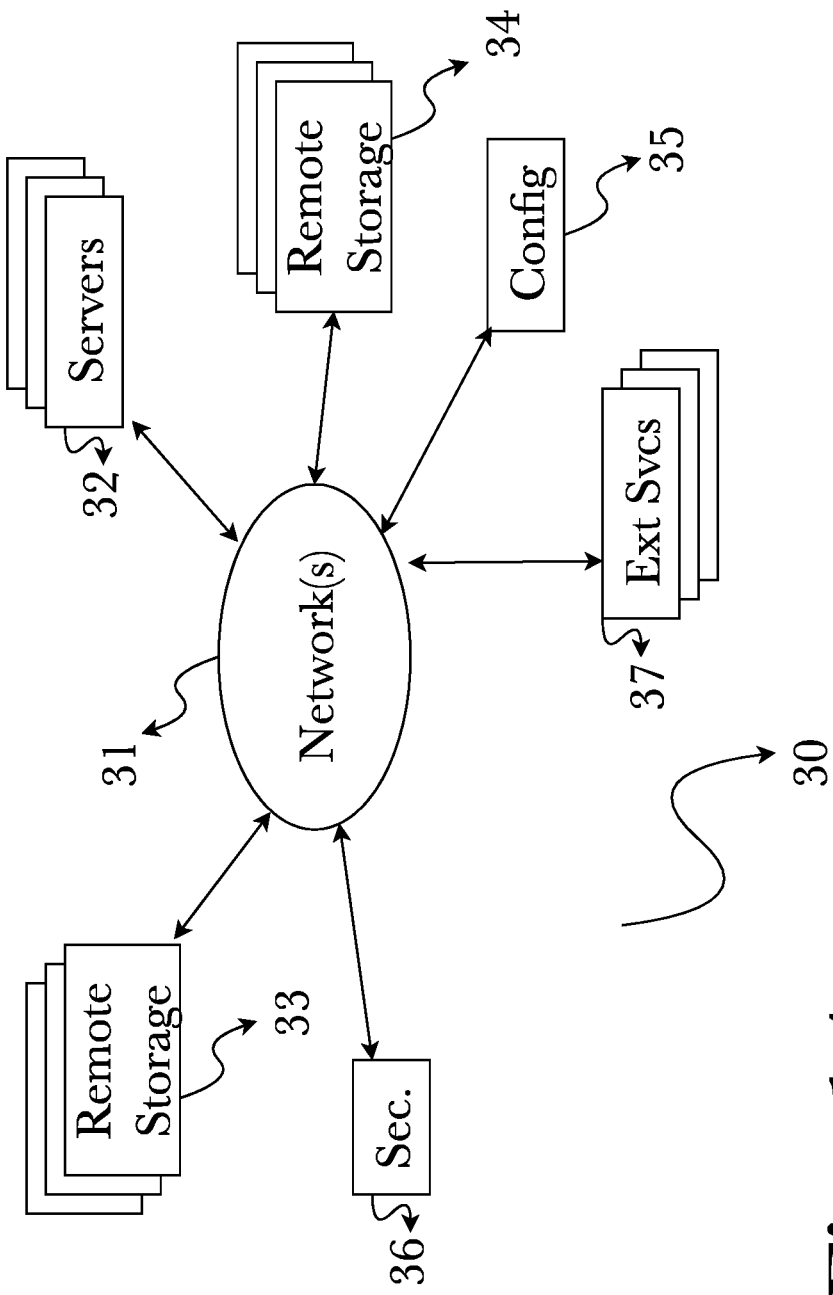
FIG. 14 is a block diagram showing an exemplary architectural arrangement of clients, servers, and external services.

In some embodiments, systems of the present invention may be implemented on a distributed computing network, such as one having any number of clients and/or servers. Referring now to FIG. 14, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 13. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 15:
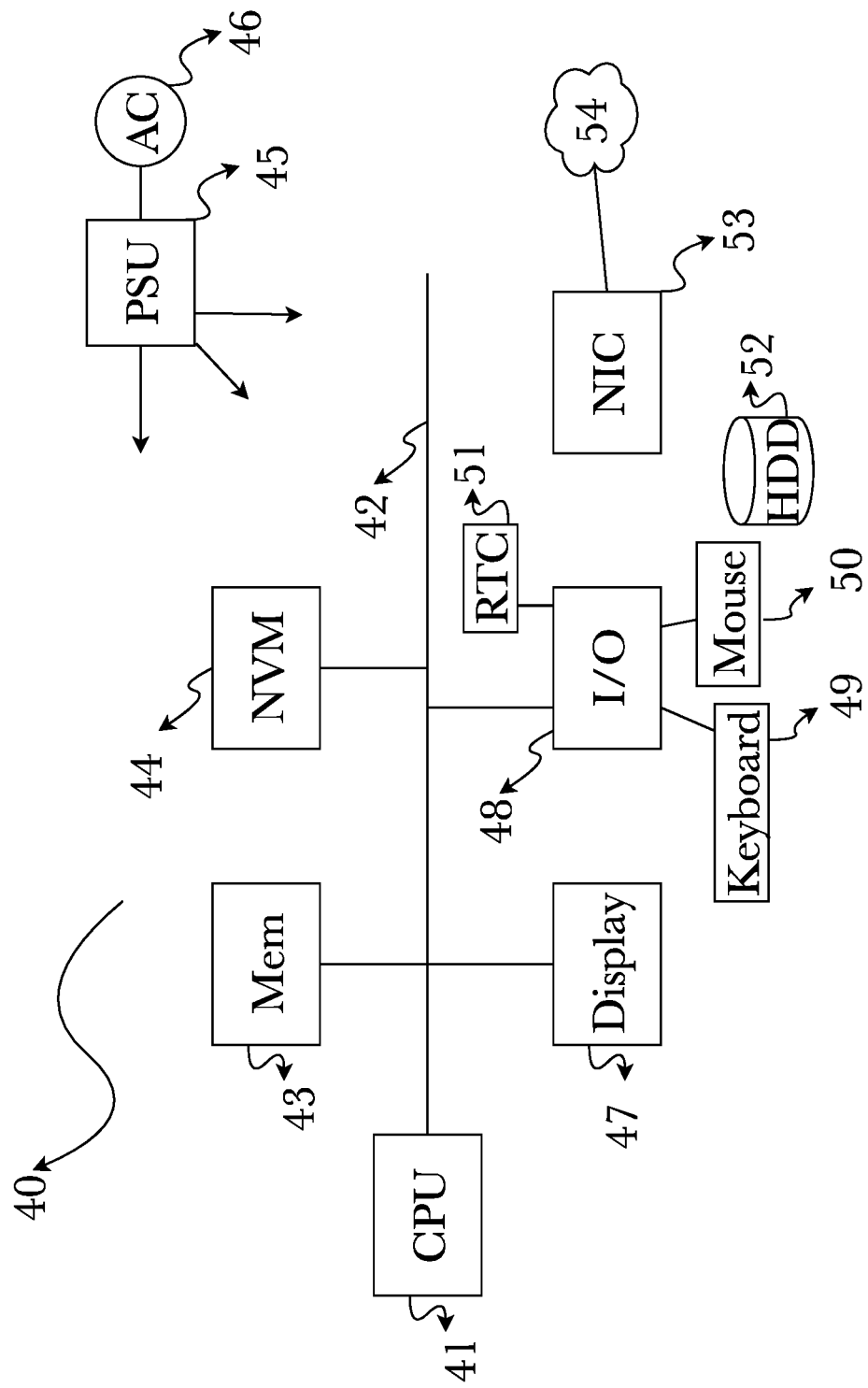
FIG. 15 is another block diagram illustrating an exemplary hardware architecture of a computing device.

FIG. 15 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for ingestion of data into a cloud-based service from an external network, comprising:
 a midserver comprising at least a processor, a memory, and a plurality of programming instructions stored in the memory and operating on the processor, wherein the plurality of programming instructions, when operating on the processor, cause the processor to:
  automatically install a virtual appliance software application, the virtual appliance software application configured to automatically load a plurality of stored configurations on the midserver;
  establish a secure network connection to an external network;
  receive data over a local network from a plurality of computing devices;
  apply a plurality of transformations to at least a portion of the received data; and
  retransmit the received data over the secure connection as a single data stream.

2. The system of claim 1, wherein the containerized services include one or more of the following types of containerized services: traffic processors, sensors, management services, and utilities.

3. The system of claim 1, wherein the midserver is installed at the same location from which some part of the external network is operated.

4. A method for ingestion of data into a cloud-based service from an external network, comprising the steps of:
 installing a midserver comprising at least a processor, a memory, and a plurality of programming instructions stored in the memory and operating on the processor;
 automatically installing, using the midserver, a virtual appliance software application, the virtual appliance software application configured to automatically load a plurality of stored configurations on the midserver;
 establishing a secure network connection from the midserver to an external network;
 receiving data over a local network from a plurality of computing devices;
 applying a plurality of transformations to at least a portion of the received data; and
 retransmitting the received data over the secure connection as a single data stream.

5. The method of claim 4, further comprising the step of including one or more of the following types of containerized services: traffic processors, sensors, management services, and utilities.

6. The method of claim 4, further comprising the step of installing the midserver at the same location from which some part of the external network is operated.

\* \* \* \* \*